United States Patent [19]

Todd

[11] Patent Number: 5,357,284
[45] Date of Patent: Oct. 18, 1994

[54] COMPATIBLE DIGITAL AUDIO FOR NTSC TELEVISION

[75] Inventor: Craig C. Todd, Mill Valley, Calif.
[73] Assignee: Dolby Laboratories Licensing Corporation, San Francisco, Calif.
[21] Appl. No.: 501,608
[22] Filed: Mar. 29, 1990
[51] Int. Cl.$^5$ .............................................. H04N 7/00
[52] U.S. Cl. ................................... 348/486; 348/482
[58] Field of Search ............................ 358/142–145, 358/141; 348/486, 482, 473, 475; H04N 7/00, 7/04, 7/06, 7/08

[56] References Cited

U.S. PATENT DOCUMENTS 5,029,003  7/1991  Jonnalogackla ..................... 358/143
5,063,446  11/1991  Gibson ............................. 358/143

OTHER PUBLICATIONS

"Draft Specification of Standards for UK Stereo with Television Transmissions," Rev. 4, Available Since May 21, 1985.
Hoffner, R., "Multichannel Television Sound Broadcasting in the United States," *J. Audio Eng. Soc.*, vol. 35, No. 9, Sep. 1987, pp. 660–665.
Eilers C. G., "the BTSC Multi-Channel Television Sound System," *SMPTE Journal*, Nov. 1986, pp. 1134–1138.
Hoffner, R., "The Future of Television Audio," *SMPTE Journal*, Nov. 1988, pp. 925–926.
Bower, A. J., "Digital Two-Channel Sound for Terrestrial Television," 1987 *IEEE International Conference of Consumer Electronics*, Jun. 2–5, 1987, Digest of Technical Papers, pp. 88, 89.
Bower, A. J., "digital Two-Channel Sound for Terrestrial Television," *IEEE Transactions on Consumer Electronics*, vol. CE-33, No. 3, Aug. 1987, pp. 286–296.
Todd, C. C., "a Compatible Digital Audio Format for Braodcast and Cable Television," 1987 *IEEE International Conference Electronics*, Jun. 2–5, 1987, Digest of Technical Papers, pp. 90, 91.
Todd, C. C., "A Compatible Digital Audio Format for Broadcast and Cable Television," *IEEE Transactions on Consumer Electronics*, vol. CE-33, No. 3, Aug. 1987, pp. 297–304.
Nybert A., "digital Multi–Channel Sound for Television," 1987 *IEEE International Conference of Consumer Electronics*, Jun. 2–5, 1987, Digest of Technical Papers, pp. 92, 93.
Todd, C. C., "Digital Sound and Data for Broadcast Television–A Compatible System," *Proceedings, 41st Annual Broadcast Engineering Conference*, National Association of Broadcasters, 1987, pp. 219–224.
Ely, S. R., "The U.K. System for Digital Stereo Sound with Terrestrial Television," *J. Audio Eng. Soc.*, vol. 35, No. 9, Sep. 1987, pp. 653–659.

*Primary Examiner*—David E. Harvey
*Attorney, Agent, or Firm*—Thomas A. Gallagher

[57] ABSTRACT

A method and apparatus for transmitting a digitally modulated Quadrature Phase Keyed (QPSK) audio carrier signal, or a digitally modulated Quadrature Partial Response System (QPRS) audio carrier signal, wherein the audio carrier signal is located 1.2 MHz below the video carrier of an NTSC signal. This places the digital audio signal 300 KHz above the analog FM sound center frequency of the NTSC signal in the adjacent lower channel, 4.8 MHz above the video carrier of the adjacent lower channel NTSC signal and at the edge of the lower vestigal video sideband components of the NTSC signal with which the digital audio signal is associated.

50 Claims, 10 Drawing Sheets

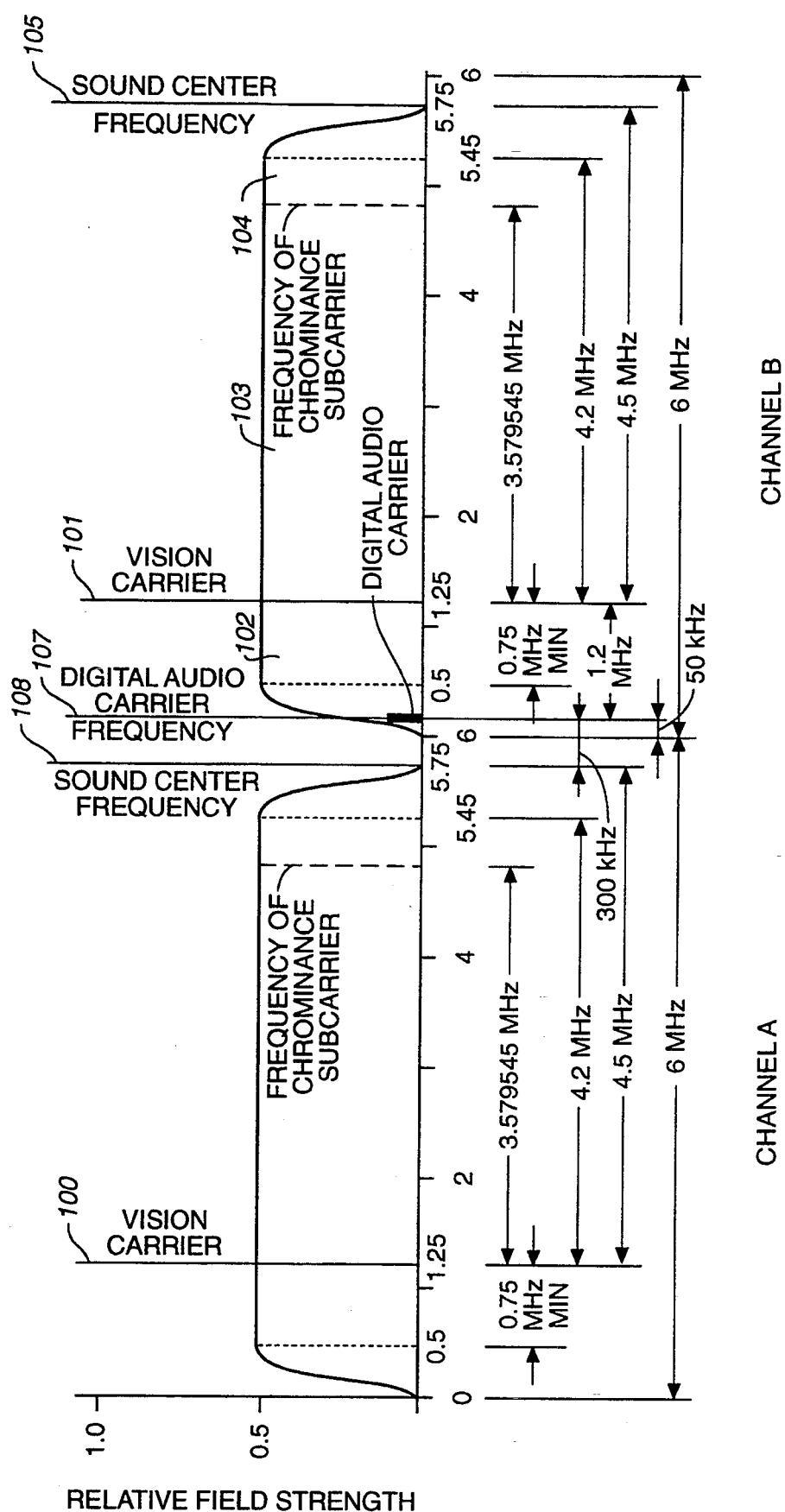
FIG._1

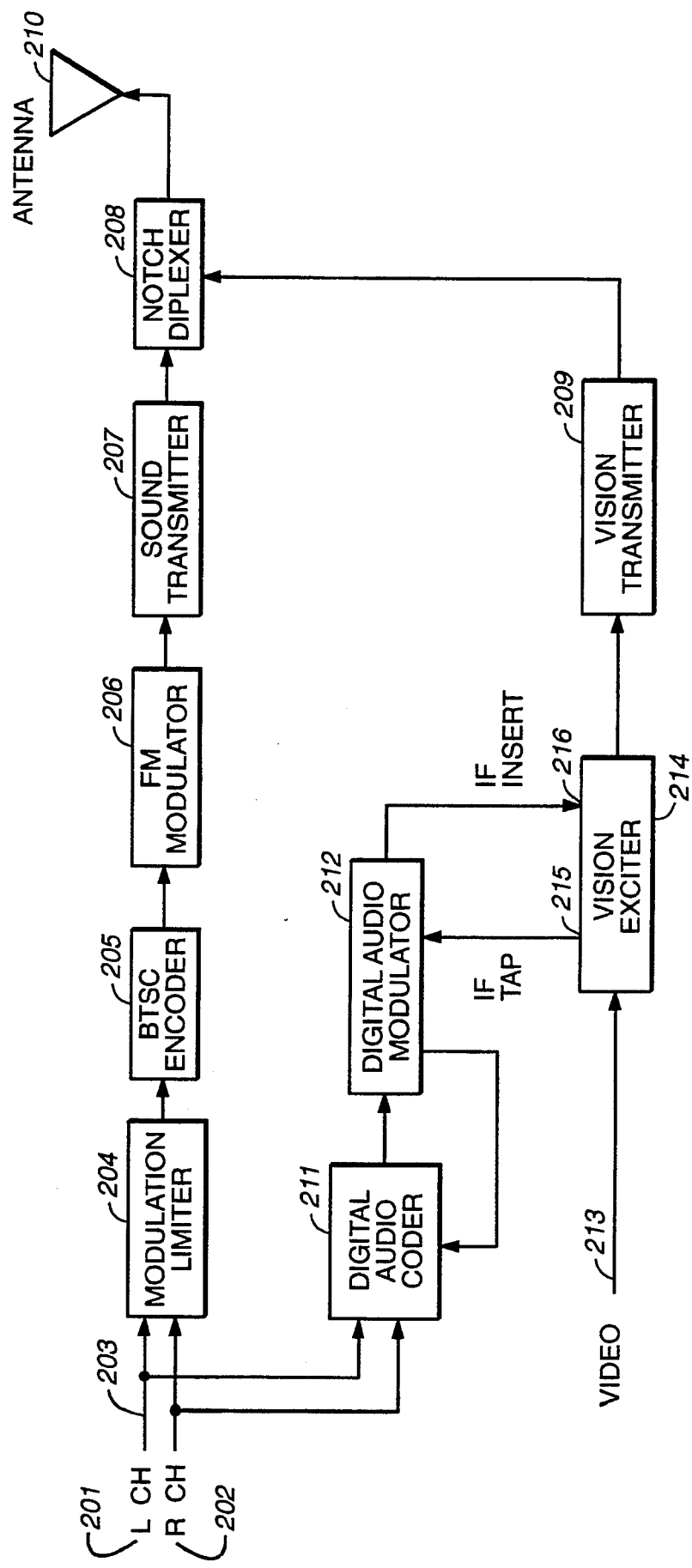
FIG._2

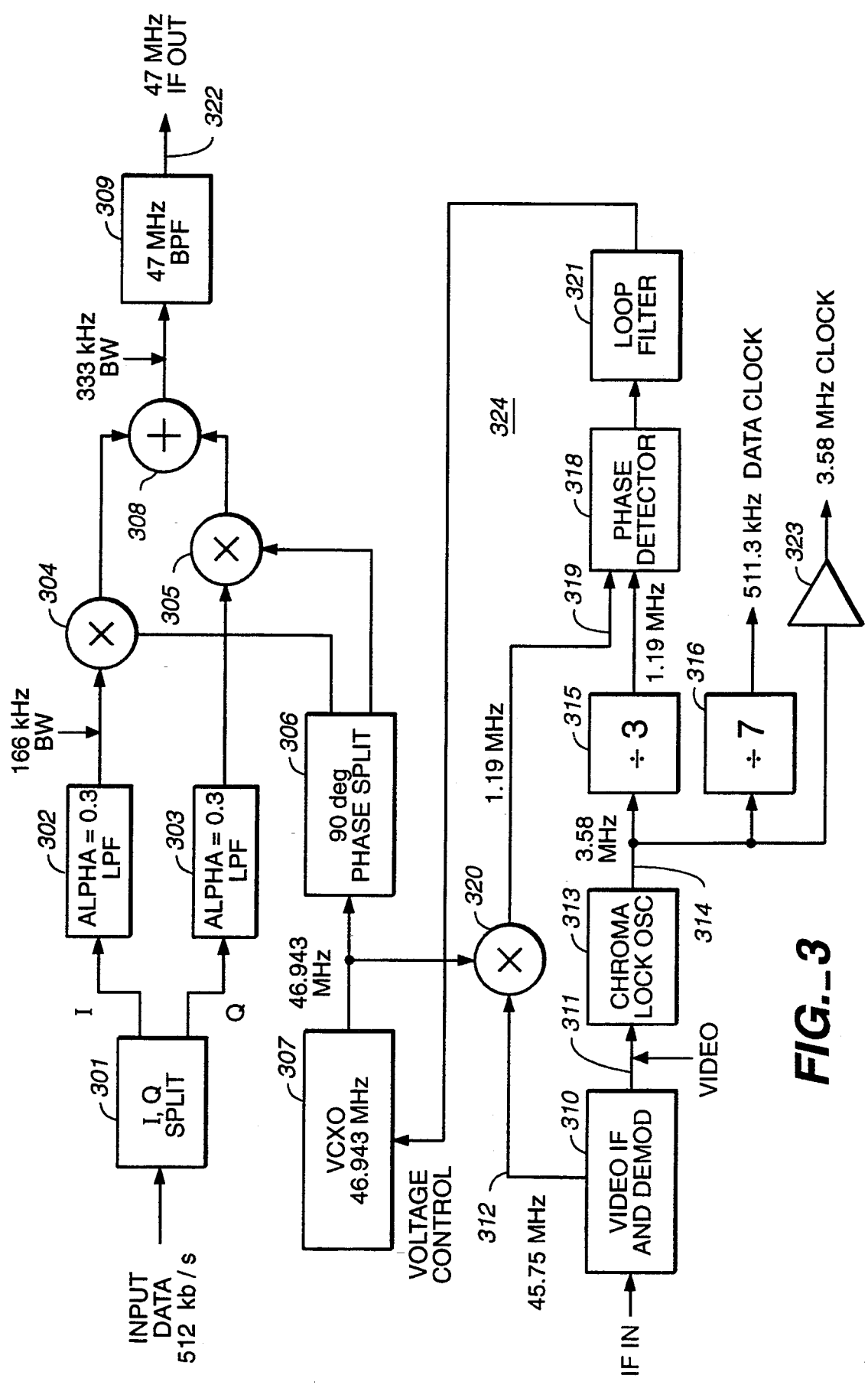
FIG._3

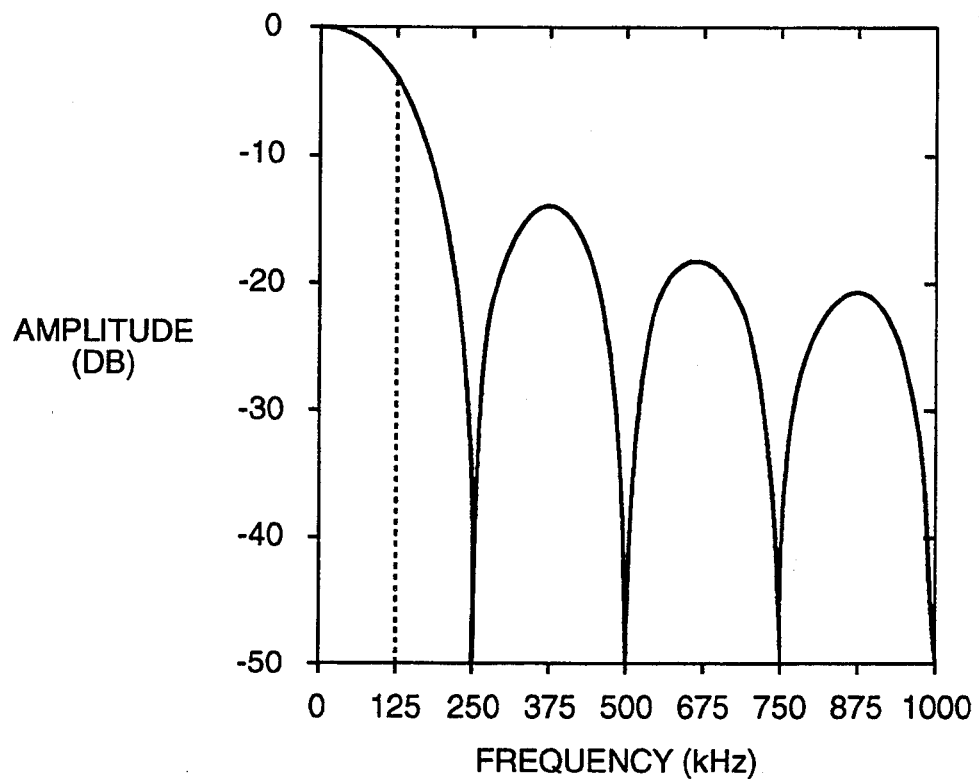
FIG._4
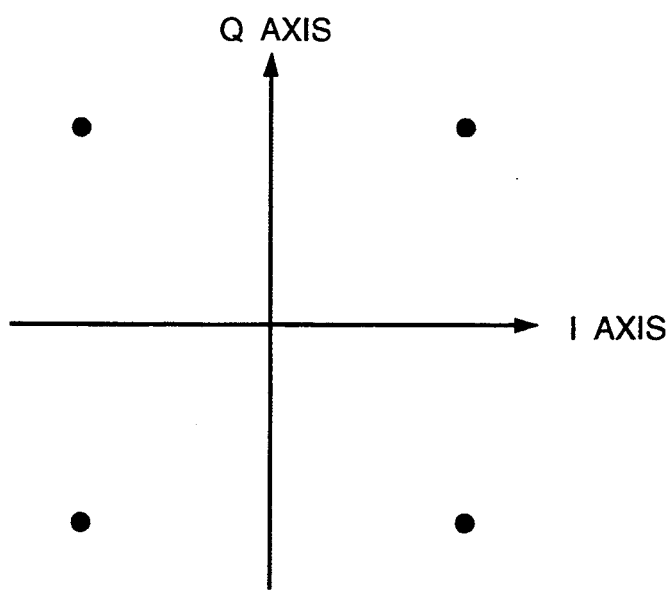
FIG._5

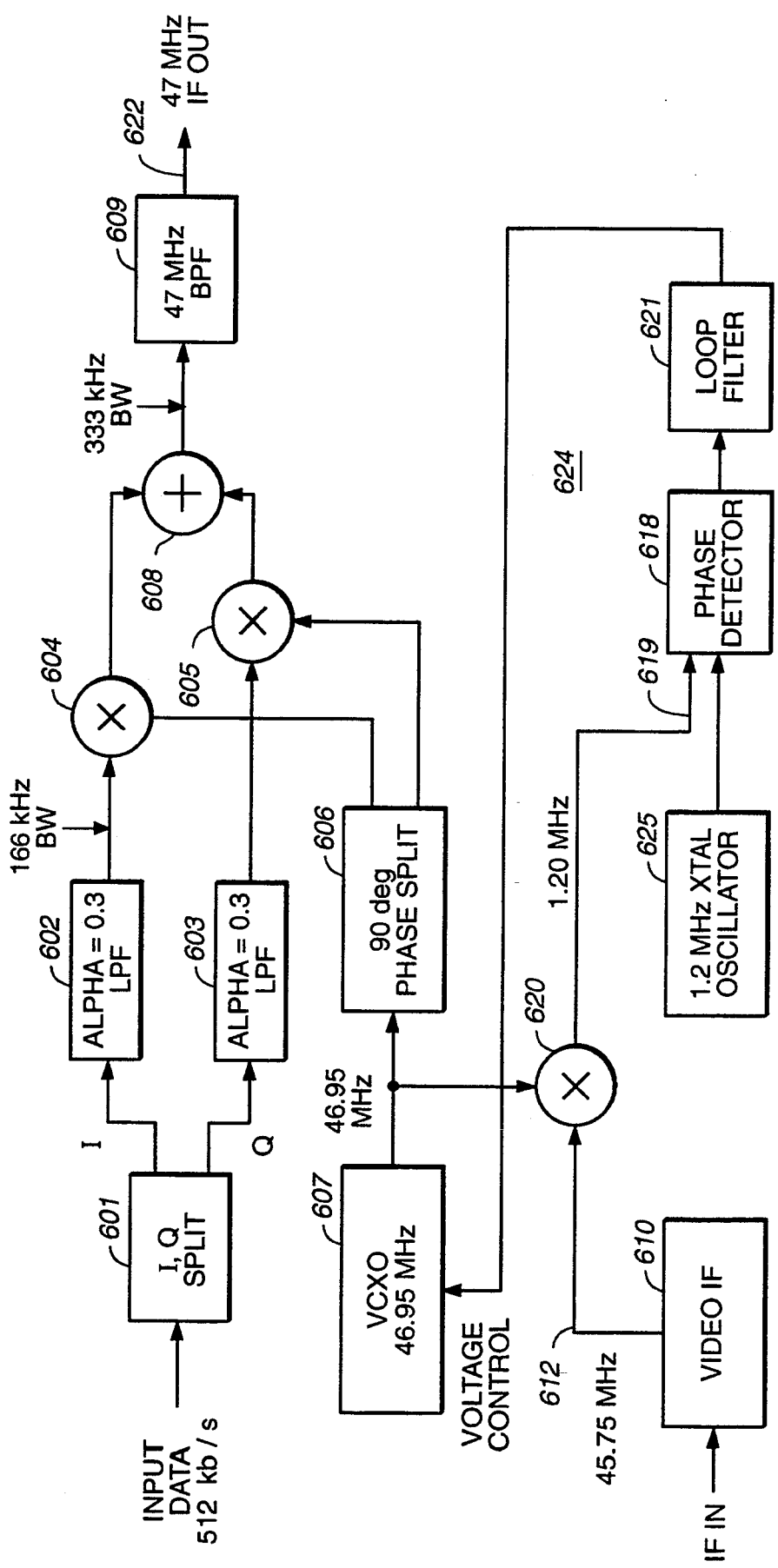
FIG._6

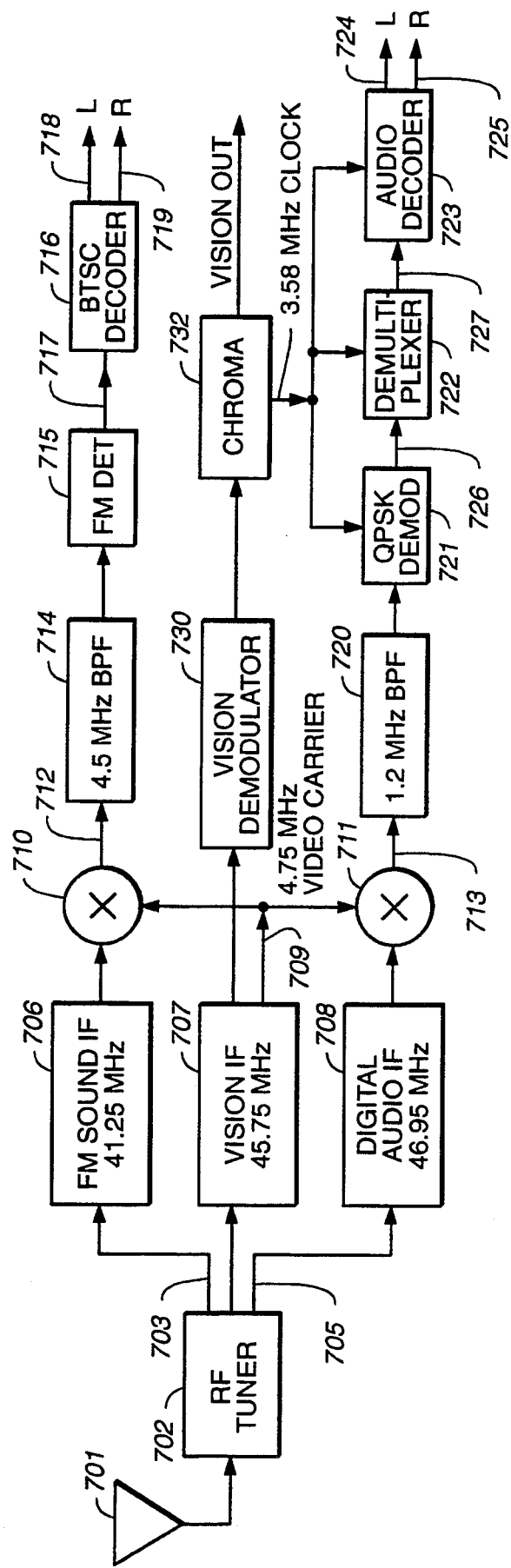
FIG._7

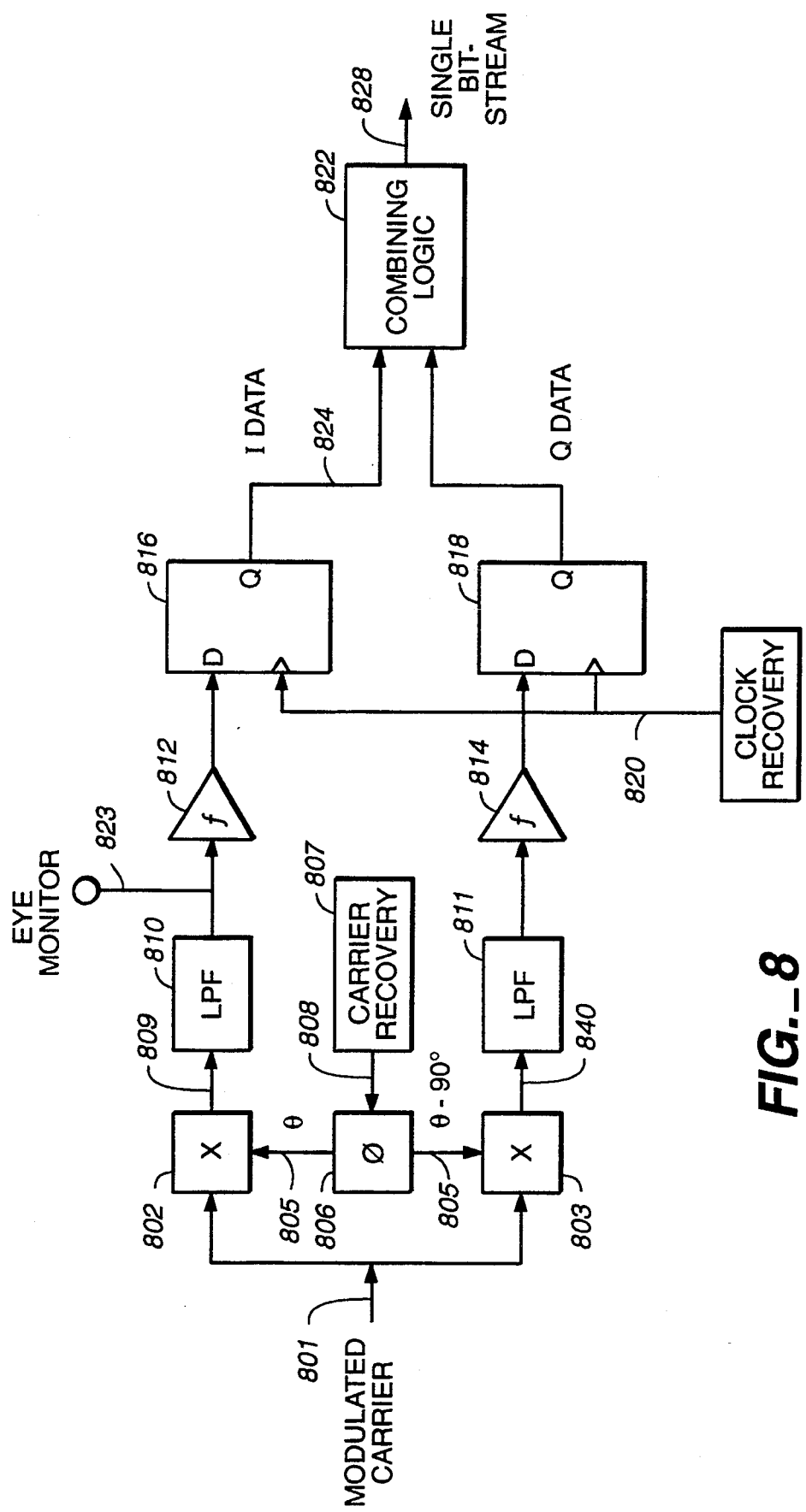
FIG._8

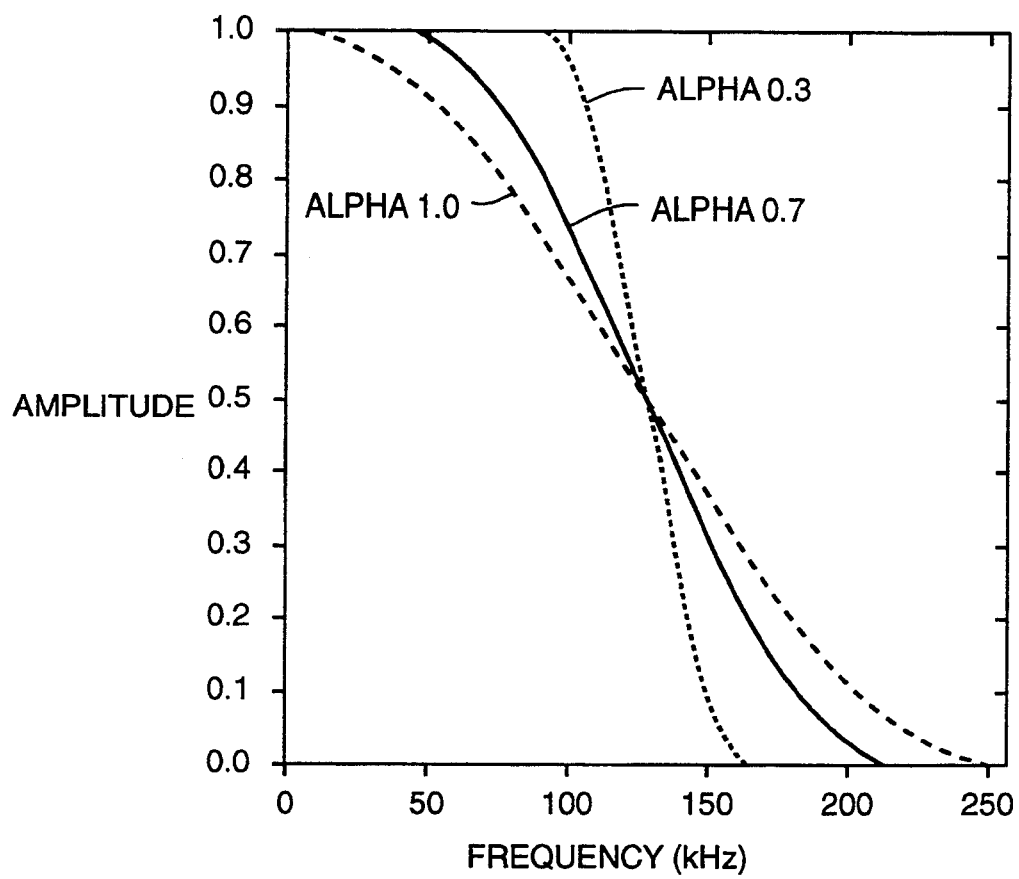
FIG._9

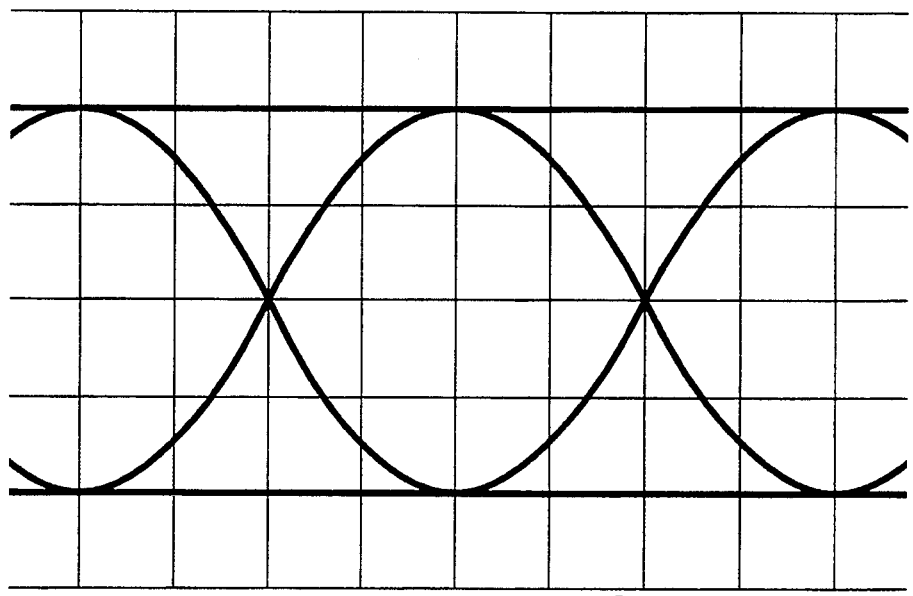
EYE PATTERN, ALPHA = 1.0
FIG._10A
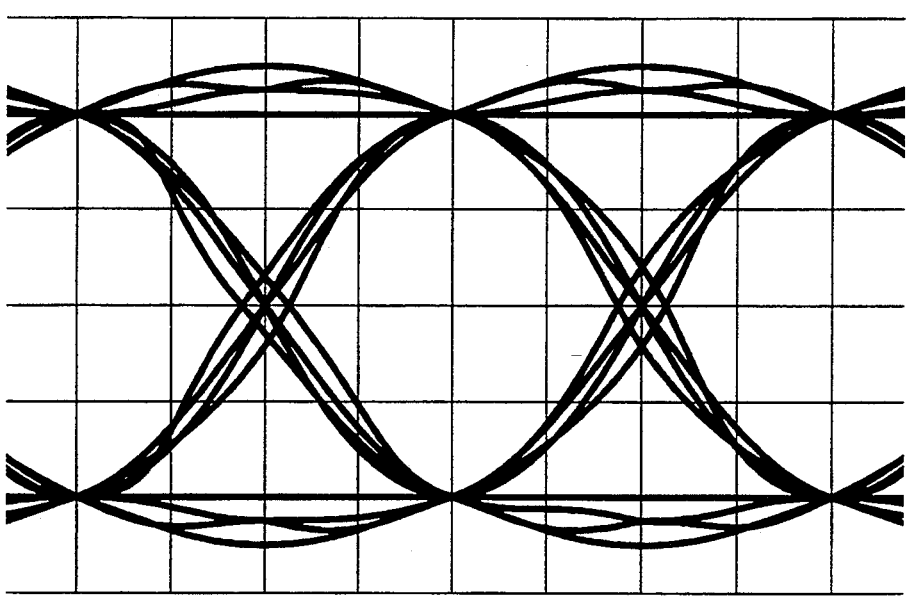
EYE PATTERN, ALPHA = 0.7
FIG._10B

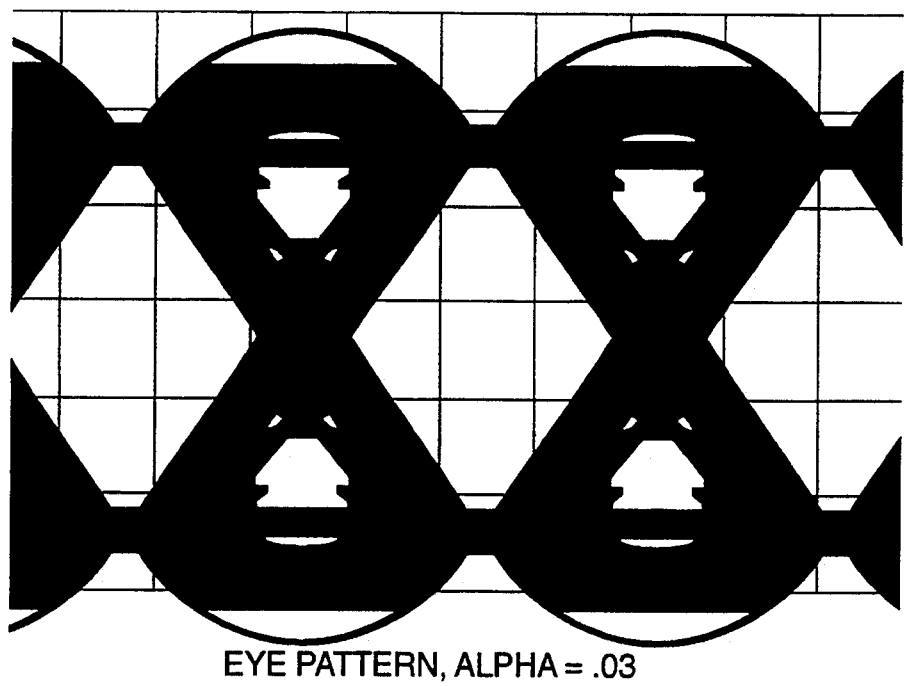
EYE PATTERN, ALPHA = .03
FIG._10C
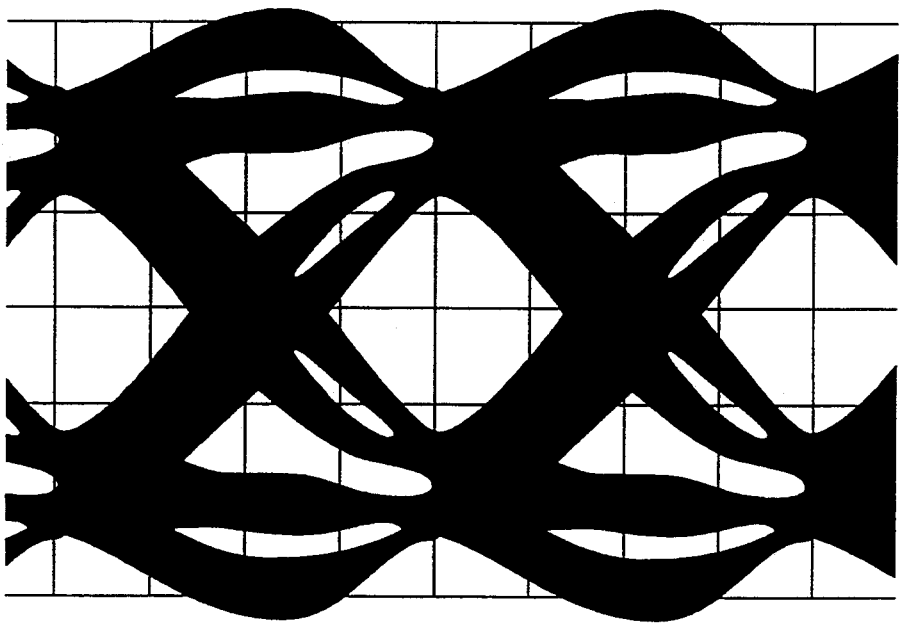
ALPHA = .03, POOR FILTER ACCURACY
FIG._10D

COMPATIBLE DIGITAL AUDIO FOR NTSC TELEVISION

BACKGROUND OF THE INVENTION

1. Field of the Invention

The invention relates generally to television transmission and reception. More particularly, the invention relates to television transmitting and receiving equipment and methods in which digitally encoded audio signals are compatibly carried with a standard NTSC color television signal, including environments in which the lower adjacent channel carries an NTSC color television signal in which the analog FM sound carrier is modulated in accordance with the BTSC multi-channel television sound system.

2. Description of Related Art

There is a growing interest in the use of digital data transmission techniques to improve broadcast audio quality. Digital transmission is inherently robust. While the coding of high quality audio into digital form theoretically entails a loss of quality, there is no further loss of quality when the digits are transmitted through an error-free channel. This is in stark contrast to the transmission of analog audio, in which a "perfect" channel is required to avoid degradation. Unfortunately, the inter-carrier sound channel used with broadcast television inherently limits the sound quality of the analog BTSC (Broadcast Television Systems Committee) Multi-Channel Television Sound (MTS) System. The BTSC MTS system is described in "The BTSC Multi-Channel Television Sound System" by Carl G. Eilers, *SMPTE Journal*, November 1986, pp. 1134–1138 and "Multichannel Television Sound Broadcasting in the United States," by Randy Hoffner, *J. Audio. Eng. Soc.*, Vol. 35, No. 9., 1987 September, pp. 660–665.

Digital transmission techniques have matured to the point that they can be applied to broadcast audio. Previous work by the present inventor led to a proposal for the addition of digital audio to the NTSC television broadcast signal. The proposal was published in two articles: "A Compatible Digital Audio Format for Broadcast and Cable Television" by Craig C. Todd, *IEEE Trans on Consumer Electronics*, Vol. CE-33, No 3, August 1987, pp. 297–305 and "Digital Sound and Data for Broadcast Television—A Compatible System," *NAB Proceedings*, 41st NAB Engineering Conference, 1987.

The inventor's 1987 proposal was based in part on work performed in Sweden and Finland in which a 512 kilobit per second (kb/s) Quadrature Phase Shift Keying (QPSK) carrier was extensively tested with PAL system B. See "Digital Multi-Channel Sound for Television," by Anders Nyberg, *ICCE Digest*, June 1987 and "Digital Two-Channel Sound for Terrestrial Television," *ICCE Digest*, June 1987. The similarities between the B-PAL television system and the M-NTSC television system with respect to signal component spectral locations suggested to the inventor that the Scandinavian test results would apply in the United States. "M-NTSC" is the designation for the standard 525 line/60 field per second NTSC system used in almost all countries using the NTSC system.

A similar digital audio system for television was also developed in the U.K. for the PAL system G. See "The U.K. System for Digital Stereo Sound with Terrestrial Television," by S.R. Ely, *J Audio Eng. Soc.*, Vol. 35, No 9, 1987, pp. 652–659. The PAL B and G systems differ principally in that the spacing between adjacent channel video carriers is 7 MHz in the PAL B system and 8 MHz in the PAL G system.

The inventor's original 1987 proposal was as follows:

A. A modulated QPSK carrier having a nominal bandwidth of about 435 kHz.

B. A digital audio carrier frequency 4.85 MHz above video carrier frequency (1.15 MHz below the video carrier frequency of the adjacent higher channel NTSC signal).

C. A digital audio carrier level at −20 dB with respect to the peak vision carrier level.

In compatibility testing of the inventor's 1987 system in a clean laboratory setting, some television receiving sets exhibited interference to the NTSC signal in the upper adjacent video channel as a result of the presence of the QPSK modulated digital audio carrier. The interference affected the luminance signal component and manifested itself as additive noise between approximately 1 MHz and 1.4 MHz. The noise level in a television receiving set exhibiting such interference is subjectively similar to the noise level resulting from a video carrier-to-noise ratio (CNR) of approximately 47 dB. While this level of interference may not be detectable in view of the low quality level of signals in many consumers' homes, the potential of improved transmission and reception systems, such as optical fibre to raise the quality level of cable television, warrants a reduction in the level of interference by approximately 6 dB in order to insure compatibility in the future. In addition, the nature of existing broadcast transmitters also calls for some changes so that the signal is more easily transmitted.

SUMMARY OF THE INVENTION

In accordance with the present invention, the new digital audio carrier is located 1.2 MHz below the video carrier of the NTSC signal. This places the digital audio signal 300 kHz above the analog FM sound center frequency of the NTSC signal in the adjacent lower channel, 4.8 MHz above the video carrier of the adjacent lower channel NTSC signal and at the edge of the lower vestigial video sideband components of the NTSC signal with which the digital audio signal is associated.

In the inventor's prior proposal, and in the above cited European proposals, the digital audio carrier associated with a particular NTSC signal is located above the video carrier frequency of the signal rather than below as in the present invention.

It may appear, particularly with respect to adjacent channel operation, that it is of little or no consequence as to whether the digital audio signal is assigned to or associated with the NTSC signal in the upper or the lower of the adjacent channels. Nevertheless, as will be explained, the choice of placing the signal below the video carrier is important to achieving a practical system in accordance with the invention.

Associating the digital audio signal with the NTSC signal above the digital carrier frequency, as taught in the present invention, is contrary to prior art approaches and the inventor's prior proposal, and initially appears to be undesirable. One reason is that the arrangement according to the invention increases the receiver complexity. For example, in a system operating according to the inventor's earlier proposal, if the bandwidth of the first sound IF stage is widened slightly, the inter-carrier mixer used to recover the 4.5 MHz analog FM sound will also recover the digital audio sound carrier at 4.85 MHz and the mixer output signal can be fed to the QPSK demodulator in addition to the conventional analog FM sound detector circuitry. However, if the digital audio carrier is below the video carrier, as in the present invention, the inter-carrier offset will be −1.2 MHz, requiring not only another inter-carrier mixer but also additional IF filtering in order to reject the image at 1.2 MHz above the video carrier frequency.

Despite the increased receiver complexity and other disadvantages discussed below, the arrangement of the present invention overcomes shortcomings of the prior art that would render the prior art proposals impractical. The most serious problem the invention overcomes is that under the inventor's 1987 proposal, the digital audio signal associated with television channel 6 would lie at 88.1 MHz, making the 88.1 MHz and 88.3 MHz FM broadcast channels unusable. The second problem relates to transmitter installations using notch diplexers, which combine the outputs of separate audio and video transmitters and feed them to a common transmitting antenna. The digital audio carrier is above the analog FM sound center frequency which is, in turn, above the upper sideband of the modulated video carrier. Consequently, the digital audio signal would have to be introduced into the sound transmitter. However, the diplexer would require expensive modifications in order to pass both the analog FM sound information centered at 4.5 MHz above the video carrier and the digital audio carrier at 4.85 MHz above the video carrier. While this is not a technical problem, it is an economic one and could seriously hamper the acceptance of the digital system by broadcasters.

By placing the digital audio signal below the video carrier the signal can be applied to the video transmitter just after the vestigial sideband video filter and it will be amplified linearly along with the video signal components. At the frequency of 1.2 MHz below the video carrier frequency the digital audio signal is readily passed to the antenna by the notch diplexer along with the vestigial sideband.

VIDEO INTERFERENCE

Although nominally between the NTSC signals in adjacent channels, the digital audio carrier is closer to the video vestigial sideband (it is located on the lower "tail" of the vestigial sideband) of the upper channel NTSC signal (the NTSC signal with which it is associated) than to the full upper video sideband of the adjacent lower channel NTSC signal (it is above the FM sound carrier center frequency which is in turn just at the edge of the upper sideband). This closer frequency relationship, along with imperfect VSB Nyquist filtering in the television receiver, makes it more likely that the digital audio signal will interfere with its own video signal than with the video signal of the lower adjacent channel. Same-channel interference is a more serious problem than co-channel interference. Co-channel interference is most likely to occur in cable television than in broadcast television because adjacent channels are less often used in broadcast television. However, such interference is less likely to be noticeable on cable television than on broadcast television because of the inferior signal to noise ratio of cable. Same-channel interference, if not minimized by proper system design, is just as likely to occur on broadcast television as on cable television, and will be more noticeable, and hence annoying, in the higher signal-to-noise ratio pictures that are achievable in broadcast television.

Because video interference caused by the channel's own digital audio is subjectively more annoying than interference from another channel, associating the digital audio signal with its own NTSC vision signal in accordance with the invention makes it even more critical to avoid such video interference. This problem is another reason that the prior art taught away from the arrangement of the present invention. While it is relatively easy to design a television receiver which rejects the digital audio signal, there are a wide variety of receivers already in use, some of which have poor rejection. A practical system cannot cause noticeable interference in such receivers having poor rejection.

Potential video interference can be reduced by: 1) lowering the digital audio carrier amplitude level, and/or 2) moving the digital audio signal carrier and signal components farther away from the video carrier (so as to move farther down on the slope of the receiver VSB filter). The digital audio carrier and signal components can be moved by either moving the carrier center frequency or narrowing the spectrum of the digital audio signal components, or both. Moving the digital audio carrier frequency down by 100 kHz from the frequency suggested in the inventor's 1987 proposal would reduce the interference into the video picture by approximately 6 dB on receivers susceptible to such interference.

AUDIO INTERFERENCE

In addition to video interference, audio interference in the adjacent lower channel NTSC signal is also of concern, particularly when that signal's analog FM sound carrier is modulated in accordance with the BTSC multi-channel television sound system. A BTSC MTS signal is far more complex than a monophonic FM sound signal and, consequently, is more susceptible to interference. The mechanism for interference into FM sound is demodulation of the digital audio signal as noise by the FM detector. The frequency of the demodulated noise is equal to the offset between the FM carrier and the digital audio signal. Since the digital audio signal is wideband, the demodulated noise is also wideband.

The inventor's 1987 proposal is sufficiently compatible with BTSC audio, but could benefit from about 6 dB of improved compatibility with video. While this could be achieved by lowering the digital audio carrier frequency by 100 kHz, this is not an acceptable solution because it would move the digital audio spectrum closer to the FM audio signal, compromising compatibility with audio.

ACHIEVING AUDIO AND VIDEO COMPATIBILITY

Another way to achieve the 6 dB improvement in video compatibility is to narrow the digital audio spectral bandwidth as the frequency is dropped, thereby keeping the lower edge of the digital audio signal components spectrum the same distance from the FM sound carrier. Theoretically, a 50 kHz lowering in carrier frequency accompanied by a 100 kHz narrowing in overall bandwidth meets the goal. Such narrowing can be achieved by more tightly filtering the digital audio signals applied to the QPSK generator (e.g., reducing the alpha factor of the filtering from $\alpha=0.7$ to $\alpha=0.3$). Assuming a total data rate of 512 kb/s, as in the inventor's 1987 proposal, this change narrows the digital audio bandwidth from about 435 kHz to about 333 kHz. Unfortunately, in practice, the improvement in video interference is only about 3 dB instead of 6 dB. This is because the more tightly filtered digital audio signal has a higher peak level and the peaks are visible in the picture. In order to obtain the additional 3 dB of interference improvement, it is necessary to lower the level of the modulated digital audio carrier by 3 dB to −23 dB relative to the peak vision carrier level.

Alternatively, instead of QPSK, a Quadrature Partial Response Signaling (QPRS) signal with the same carrier frequency but with a level of −20 dB with respect to the peak vision carrier level and a narrower spectral bandwidth may be used. The spectrum of a QPRS signal has a null at frequencies which are multiples of one-half of the input bit-rate. A PRS cosine filter rejects components at all frequencies above the first null frequency, enabling the digital data to be transmitted in a bandwidth of exactly one-half of the input bit-rate. The QPSK and QPRS signals will have comparable RMS levels and, using non-redundant error correction in the QPRS demodulator, they will also have similar performance in the presence of gaussian noise (the QPSK signal has a 1.3 dB advantage).

Based on relative costs and performance in the presence of interfering signals, QPSK is preferred over QPRS, although QPRS is an alternative. With respect to costs, QPRS requires a more expensive decoder: two comparators instead of one are required to convert from the analog waveform back to digital data. The level of the QPRS waveform at the comparator inputs of the receiver demodulator is also more critical, so a better automatic gain control (AGC) is required.

INTERFERENCE TO THE DIGITAL AUDIO SIGNAL

With respect to performance in the presence of interfering signals, the digital audio signal is subject to interference from both the nearby FM audio signal components and the nearby lower vestigial sideband video components. The receiver's digital audio demodulator filtering can adequately reject interference from the FM audio signal components. However, interference from video cannot be fully filtered out because it can be in-band (i.e., the digital audio signal spectrum and the "tail" portion of the vestigial sideband components may partially overlap in frequency), depending on the VSB filter characteristics in the modulator. With respect to the problem of interference to the digital audio signal, QPSK is preferred. QPRS is more susceptible to interference from lower sideband video information: the −20 dB QPRS system suffers a 2 dB interference penalty compared to the −23 dB QPSK system.

As mentioned above, the QPSK digital audio carrier frequency according to the invention is 1.2 MHz below the video carrier frequency. This value is very close to one-third (⅓) of the 3.579545 MHz NTSC chrominance subcarrier frequency (i.e., 1.193182 MHz. To avoid cluttering up the application with endless digits, the NTSC chominance subcarrier frequency, 3.579545 MHz, will be abbreviated to 3.58' MHz, and the frequency of one-third of the NTSC chroma subcarrier frequency will be abbreviated to 1.19' MHz)). A digital audio carrier frequency of 1.19' MHz is a convenient value to choose, because it allows television receiver circuits to use the chroma oscillator as a reference to demodulate the digital audio, instead of a requiring a separate crystal oscillator to be locked to the incoming carrier. Embodiments of the invention using both a 1.2 MHz crystal oscillator-derived digital audio carrier frequency and a 1.19' MHz chroma oscillator-derived digital audio carrier frequency will be discussed below.

The data rate of the digital audio applied to the QPSK generator may also be locked to the chrominance subcarrier frequency. A preferred digital audio coding method is adaptive delta modulation as described in "An Audio Broadcast System Using Delta Modulation" by Kenneth Gundry, *SMPTE Journal*, November 1985, pp. 1185-1190. Certain aspects of that system are also the subject of U.S. Pat. Nos. 4,700,361 and 4,700,362. Each of those patents is hereby incorporated by reference in their entirety. This adaptive delta modulation system is preferred because it permits the use of very low cost digital to analog decoders in the television receiver. Approximately 512 k bits/sec of data (total data rate) is required for use of this low cost digital audio coding method when two audio channels each sampled at 204 kb/s are applied to the QPSK generator. The same adaptive modulation system was used in the Scandinavian experiments discussed in the Nyberg paper cited above. Using one-seventh (1/7) of the chrominance subcarrier frequency as a data clock results in a total bit rate of 511.363 kb/s. Using the chroma oscillator in the receiver as a data clock reference saves another crystal in the data timing recovery circuitry.

In applications in which a lower total data rate can be traded off for a higher cost decoding system in the television receiver, adaptive transform coding may be employed instead of adaptive delta modulation. Such a system could use a data clock rate of one-fourteenth of the chroma subcarrier frequency, giving a bit rate of 255,681 kb/s. A suitable adaptive transform coding system is described in U.S. patent application Nos. 303,714, filed Jan. 27, 1989; 439,868, filed Nov. 20, 1989; and 458,894, filed 29 Dec. 1989, and in International Application under the Patent Cooperation Treaty No. PCT/US 90/00507, filed on Jan. 27, 1990.

BRIEF DESCRIPTION OF THE DRAWINGS

FIG. 1 is an idealized graphical representation of the field strength versus R.F. frequency of some components of two NTSC signals in adjacent channels for the purpose of showing the location of the digital audio carrier according to the present invention relative to the other parts of the NTSC signal.

FIG. 2 is a block diagram showing a television transmitter adapted for transmission of the digital audio signal according to the present invention.

FIG. 3 is a block diagram of the modulation scheme used to insert the digital audio signal into the NTSC composite vision signal.

FIG. 4 is a curve showing the spectrum of a 250 kb/s digital signal.

FIG. 5 shows the constellation of a QPSK-encoded digital signal.

FIG. 6 is a block diagram of an alternative modulation scheme used to insert the digital audio signal into the NTSC composite vision signal.

FIG. 7 is a block diagram showing a television receiver adapted for reception of the digital audio signal according to the present invention.

FIG. 8 is a block diagram of the digital demodulation scheme used in the receiver.

FIG. 9 shows the frequency response of the preferred "raised cosine" filter with various values of alpha.

FIG. 10A–10C shows the effect of filtering with different values of alpha on the waveform recovered in the demodulator.

DESCRIPTION OF THE PREFERRED EMBODIMENTS

FIG. 1 shows a plot of relative field strength versus frequency of two adjacent NTSC channels. Two arbitrary adjacent channels are shown, the frequency of vision carrier 100 of channel A is lower than that of vision carrier 101 of channel B. Cable television channels have the same spacing; moreover, it is far more common for adjacent channels to be used in cable television than in broadcast television. The channels are spaced 6 MHz apart, and the corresponding elements within each channel are spaced 6 MHz apart. Within each channel, there is a vision carrier 101 on which the picture information is modulated. A vestigial side-band modulation scheme is used with the result that vision carrier 101 is asymmetrically placed within the channel, at 1.25 MHz above the lower-frequency limit of the channel. Vestigial side-band 102 extends 750 kHz below the vision carrier, and is then attenuated so that its amplitude falls to zero at frequencies more than 1.25 MHz below vision carrier 101, i.e. at frequencies outside the channel limits. Main side-band 103 extends upwards in frequency to 4.2 MHz above the vision carrier frequency, and then is attenuated so that its amplitude falls to zero at frequencies greater than 4.5 MHz above the vision carrier frequency. At the upper end of main side-band 102, at 3.579545 MHz above the vision carrier frequency, lies chrominance sub-carrier 104. This is modulated with color information using a vestigial side-band modulation scheme, the main side-band extending downwards in frequency in this case.

The FM sound channel is located at the high-frequency end of each channel, sound-channel center frequency 105 being located at 4.5 MHz above the vision carrier frequency. Prior art approaches to adding digital audio to the NTSC television channel, such as the inventor's 1987 proposal, have concentrated on locating the digital audio carrier at frequencies above the main vision sideband, in the region above the upper frequency end of the sound channel. For instance, the inventor's 1987 proposal located the digital audio carrier at 4.85 MHz above vision carrier 101, which actually put it into the next higher adjacent channel.

Digital audio carrier 107 of the present invention is located on the skirt of the vestigial vision side-band 102, at a frequency about 1.2 MHz below the frequency of vision carrier 101. This puts the digital audio carrier frequency about 50 kHz above the lower limit frequency of channel B, and about 300 kHz above the center of sound channel 108 of channel A. This choice of digital audio carrier frequency not only allows an NTSC television signal with digital audio on channel 6 to co-exist with the FM radio channels at 88.1 MHz and 88.3 MHz, it also allows the digital audio signal to be added to the video signal at the transmitter without the need to modify the notch diplexer at the transmitter.

With prior art systems, stations which use separate transmitters for sound and vision would have to introduce the digital audio signal into the sound transmitter. The outputs from the sound and vision transmitters are then combined in a device known as a "notch diplexer" in which tuned cavities (creating notches) reflect the sound signal into the antenna. Since there are no cavities tuned to the frequency of the digital audio carrier, the diplexer would need expensive modifications. While this is not a technical problem, it is an economic one to be considered when designing a digital audio signal that could be adopted easily by broadcasters. A digital audio carrier frequency located within the normal video bandwidth allows the digital audio signal to be fed into the vision transmitter after the vestigial sideband filter and simply be amplified along with the vision signal. This choice of digital audio carrier frequency does not require extensive transmitter modifications, and is thus to be preferred as a much more practical alternative to the prior art.

The audio interference performance of the inventor's previous proposal, using QPSK modulation and a modulated digital audio carrier level of −20 dB relative to peak vision carrier level, was acceptable, but an improvement of about 6 dB in vision interference was desirable. Vision interference can be improved by moving the frequency of digital audio carrier 107 down by 100 kHz, but this would cause an unacceptable degradation in audio interference. In the present invention, a digital audio carrier frequency of 1.2 MHz below vision carrier frequency moves the digital audio carrier further away from the vision signal and closer to the FM audio signal by 50 kHz, not by the full 100 kHz. In the previous system, the digital audio carrier was 350 kHz above the center of the FM sound channel of the same channel, in the new system, it is 300 kHz above the center of the sound channel of the adjacent (lower) channel. In the previous system, the digital audio carrier was 1.15 MHz from the vision carrier of the adjacent (higher) carrier, it is now 1.2 MHz from the vision carrier of the same channel.

On its own, changing the digital audio carrier frequency does not completely solve the interference problem: in addition, the bandwidth of the digital audio signal is reduced by 100 kHz by using a a sharper filter characteristic in the digital modulator. Theoretically, this change should be sufficient to produce the desired 6 dB improvement in vision interference, but in practice, an improvement of only about 3 dB is realized. This is because the sharper filter characteristic results a higher peak digital audio level, and the peaks can be seen in the picture. A further 3 dB of improvement is obtained by reducing the level of the modulated digital audio carrier by 3 dB, to −23 dB relative to peak vision carrier level. Alternatively, the more complex but narrower band width QPRS modulation scheme with a carrier level of −20 dB could be used.

FIG. 2 shows how the digital audio signal is injected into the television transmitter. Left and right channel analog audio signals 201 and 202 from the audio mixing console in the master control room are fed via a studio-to-transmitter link to the transmitter site. Video signal 213 is similarly fed from the master control room to video exciter 214 at the transmitter site. At the transmitter site, audio signals 201 and 202 are split into two paths at node 203. One path leads to the FM sound path, consisting of limiter 204, BTSC encoder 205, FM modulator 206 and sound transmitter 207. The output of sound transmitter 207 is combined with the output of vision transmitter 209 at notch diplexer 208, whence the two signals are fed to transmitting antenna 210.

The other path from node 203 leads to the digital audio path, consisting of digital audio coder 211 and digital audio modulator 212. A number of alternatives exist for digital audio coder 211. Digital audio can be added to the NTSC television signal only if a relatively low bit-rate is used. The above discussion of digital audio carrier frequency and level was based on the assumption that a total bit rate of about 512 kb/s would be used. "Total" bit rate means the bit rate for two audio channels with full overhead for framing, error correction, signalling, etc. Moreover, the audio quality of the decoded digital audio signal in the receiver needs to be comparable with that of other consumer digital audio sources, such as the Compact Disc, and superior to that of the BTSC sound system. The low bit-rate rules out approaches such as 16-bit linear PCM, which is used on Compact Disc: one audio channel of 16-bit PCM alone, without overhead, would exceed the total bit-rate allocation for this application. Various companded PCM systems offer lower bitrates, but suffer from well-known performance defects.

A preferred digital audio coding method is adaptive delta modulation as described in "An Audio Broadcast System Using Delta Modulation" by Kenneth Gundry, SMPTE Journal, November 1985, pp. 1185–1190. Certain aspects of that system are also the subject of U.S. Pat. Nos. 4,700,361 and 4,700,362. Encoders for this system, specifically the Model DP 85, manufactured by Dolby Laboratories, Inc. are already commercially available, and are in use in various satellite broadcasting and distribution applications. This adaptive delta modulation system is preferred because it permits the use of very low cost digital to analog decoders in the television receiver. A two-channel decoder is available in single-chip integrated circuit form, the Signetics NE 5241. Approximately 512 kb/s of data (total data rate) is required for this low cost digital audio coding method for two audio channels. Using one-seventh (1/7) of the chrominance subcarrier frequency as a data clock results in a total bit rate of 511.363 kHz. Using a chroma oscillator-related clock rate as the data clock reference saves another crystal in the data timing recovery circuitry in the receiver.

In applications in which a lower total data rate and a longer video-to-audio delay can be traded off for a higher cost decoding system in the television receiver, adaptive transform coding may be employed instead of adaptive delta modulation. The use of such a coding scheme could allow the digital audio system to have at least a monophonic, and possibly a stereophonic, second audio program (SAP) capability. The present BTSC multi-channel analog sound system has a monophonic SAP capability.

Integrated audio modulator 212 is fed with an intermediate-frequency NTSC composite video signal extracted from port 215 in the vision exciter by means of, for instance, a directional coupler or other means well known in the art. It is also fed with the digital audio bitstream from the output of digital audio coder 211. It modulates an appropriate frequency carrier with the digital audio bit stream and inserts the modulated signal back into vision exciter 214 at insert point 216, where it is mixed with the composite video-modulated IF signal. Again, a directional coupler or other means well known in the art can be used for this purpose. As mentioned above, the digital audio modulated IF signal must be inserted into vision exciter 214 downstream of the vestigial side-band attenuator to prevent attenuation of the digital audio signal. The output from vision exciter 214, which now includes the digital audio signal, passes to vision transmitter 209, the output of which is connected to antenna 210 via notch diplexer 208.

FIG. 3 is a block diagram of digital audio modulator 212. To understand it, some of the basics on Quadrature Phase Shift Keying or QPSK digital modulation need to be discussed. FIG. 4 shows the spectrum of a random data stream with a data rate of 250 kb/s (In digital transmission, the data is always intentionally scrambled so that the transmitted data appears random.). Note the spectral nulls at multiples of the data rate (250 kHz, 500 kHz, etc.). According to the Nyquist sampling theory, all information in this signal may be gleaned from the first 125 kHz, i.e. the Nyquist frequency which is one-half of the 250 kHz sampling rate. If the digital data signal is passed through an infinitely steep low-pass filter (a "brick-wall" filter) at the Nyquist frequency of 125 kHz, and the resulting filtered signal used to modulate a carrier, the modulated carrier will have a double sideband modulated bandwidth of 250 kHz, which will carry 250 kb/s of data (1 b/s/Hz). If a second 250 kb/s digital data stream is modulated onto a carrier at the same frequency but in quadrature, this will double the information in the 250 kHz bandwidth RF signal to 500 kb/s, or 2 b/s/Hz.

In data modulator 212 (FIG. 2), the approximately 512 kb/s digital bit stream from the output of digital audio coder 211 is fed into I,Q splitter 301. Here, alternate bits in the bit stream are assigned to the I or the Q channel, resulting in two digital bit streams at half the bit-rate of the incoming bitstream. Alternatively, a differential QPSK method can be used. Differential QPSK avoids the problem of having to discern the absolute phase of the digital audio signal in the receiver. It generates the next value of I and the next value of Q necessary to indicate the change in phase from that represented by the current values of I and Q to that represented by the next two bits in the incoming bit stream. A differential QPSK splitter looks at the current values of I and Q and the next two bits of the incoming bitstream.

The digital audio carrier is generated by voltage-controlled oscillator 307, details of which will be discussed later. In the intermediate-frequency domain of the vision exciter, at which frequencies digital audio modulator 212 (FIG. 2) operates, oscillator 307 generates a frequency of 46.94 MHz (when the digital audio carrier frequency is offset 1.19' MHz below the vision carrier frequency), which is 1.19' MHz above the vision intermediate frequency. When the reverse-order intermediate frequencies are mixed with the local oscillator in the output stages of the transmitter, the RF carrier is modulated with the different frequencies in the correct order (i.e. with the digital audio carrier 1.19' MHz below the vision carrier). The digital audio carrier in the vision IF domain will be called the digital audio intermediate frequency.

The I and Q bit streams are both filtered to a bandwidth of 133 kHz by means of filters 302 and 303. More will be said about filtering later. The output of digital audio intermediate frequency oscillator 307 is fed into phase splitter 306 which generates two signals in quadrature with one another at the digital audio intermediate frequency. The two filtered bit streams from filters 302 and 303 and the two digital audio intermediate frequency signals from phase splitter 306 are fed into double-sideband AM modulators 304 and 305. The outputs of modulators 304 and 305 are then combined in summer 308, passed through digital audio IF band-pass filter 309 and fed to the vision exciter at port 216 (FIG.

2) as described above. The signal at the output of summer 308 has a bandwidth of 333 kHz.

Modulator 304 can be considered as a phase modulator, generating phases of 0 and 180 degrees. Modulator 305 can be considered as generating phases of 90 and −90 degrees. Summing the outputs of the two modulators will therefore generate one of four phases, +45 degrees, −45 degrees, +135 degrees, and −135 degrees. FIG. 5 shows the constellation diagram for a QPSK signal. The phase of the RF carrier can have one of four possible states. Each set of four possible states is referred to as a symbol. Since there are four states per symbol, each symbol can transmit two bits. Thus, with a symbol rate of 256,000 symbols per second, a total data rate of 512 kb/s can be transmitted. If low-pass filters 302 and 303 were not present, the carrier phase would instantaneously jump between the four states at 256,000 jumps per second. In practice, filters 302 and 303 cause the phase of the carrier to change continuously between the four phase states shown in FIG. 5. The receiver is then designed to extract the digital information in the waveform by sampling the signal only at the time that the signal is passing through the constellation points. This will be discussed later.

The frequency of the digital audio intermediate frequency needs to be accurately controlled relative to the actual vision carrier intermediate frequency of the vision transmitter to that the digital audio intermediate frequency has the required spacing from the vision carrier intermediate frequency. This cannot simply be done by using an accurate crystal oscillator for digital audio intermediate frequency oscillator 307, because a frequency error between this oscillator and the transmitter's vision intermediate frequency causes an error in the frequency of the digital audio carrier equal to the frequency error multiplied by the ratio of approximately 47/1.2. Thus, if the digital audio intermediate frequency oscillator and the vision carrier intermediate frequency both have errors of ±5 ppm, this would result in an unacceptably large uncertainty of ±400 ppm in the digital audio carrier frequency. Thus, oscillator 307 is phase-locked to the vision carrier intermediate frequency of vision exciter 214.

Demodulator 310 recovers the vision signal from the intermediate frequency signal taken from vision exciter 212, and produces video signal 311 and 45.75 MHz vision carrier IF carrier signal 312. Chroma-lock oscillator 313 locks a 3.58' MHz oscillator to the color-burst signal extracted from vision signal 312 using techniques that are well-known in the art. The 3.58' MHz signal 314 at the output of chroma-lock oscillator 313 is fed into dividers 315 and 316. Divider 315 divides the 3.58' MHz signal by three (3) to produce the preferred digital audio carrier frequency offset of 1.19' MHz. This frequency is so close to the frequency of 1.200000 MHz chosen for the digital audio carrier offset, and is so convenient to generate, that it is the preferred frequency of the digital audio carrier in most applications.

The output of divider 315 is fed into phase detector 318. The other input of phase detector 318 is supplied with the 1.19' MHz signal 319 obtained by mixing together the output of digital audio intermediate frequency oscillator 307 and vision carrier intermediate frequency signal 312 in mixer 320. The output of phase detector 318 controls the frequency of oscillator 307 through loop filter 321, which sets the dynamic characteristics of the control loop. The phase-lock loop formed by mixer 320, phase detector 318 and loop filter 321 keeps the frequency of oscillator 307 at exactly the frequency of the output of divider 315 above the frequency of vision carrier intermediate frequency signal 312. The frequency accuracy of digital audio intermediate frequency signal 322 relative to the vision carrier intermediate frequency is thus ensured.

FIG. 3 also shows divider 316, which divides the 3.58' MHz output of chroma-lock oscillator 313 by a factor of seven (7) to serve as a 511.363 kHz data clock for digital audio coder 211 (FIG. 2). In practice, however, digital audio coder 211 is more likely to be designed to accept the 3.58' MHz output from chroma-lock oscillator 313 via buffer 323 and to generate from this clock frequency by a process of division the several internal clock frequencies it requires. One of the internal clock frequencies generated would involve dividing the 3.58' MHz clock frequency by seven to provide the clock frequency for the digital bit stream fed from digital audio coder 211 (FIG. 2) to data modulator 212.

If it is not desired to relate the digital audio carrier frequency to the color subcarrier frequency, an independent 1.2 MHz crystal oscillator can be used instead of the output of divider 315 (FIG. 3). Since it is still necessary for the digital audio intermediate frequency to be accurately offset in frequency from the frequency of the vision carrier intermediate frequency, a phase-lock loop technique similar to that discussed above must be used. FIG. 6 is a block diagram of such an arrangement. Parts which are the same in FIG. 6 as in FIG. 3 use the same reference numbers, the first digit of the FIG. 6 references being 6 instead of 3. In FIG. 6, chroma-lock oscillator 313 and divider 315 (FIG. 3) are replaced by 1.2 MHz crystal oscillator 625. The phase-lock loop formed by mixer 620, phase detector 618 and loop filter 621 sets the frequency of digital audio intermediate frequency generator 607 at the frequency of crystal oscillator 625 above the frequency of vision carrier intermediate frequency signal 612. This ensures the frequency accuracy of digital audio intermediate frequency signal 622 relative to the frequency of the varion carrier intermediate freqnency. Otherwise, the modulator of FIG. 6 works identically to that of FIG. 3.

If vision exciter 214 generates its intermediate frequencies by means of a frequency synthesizer, it may be possible to divide a frequency available from the frequency synthesizer to produce a signal of approximately 1.2 MHz to substitute for crystal oscillator 625. Alternatively, it may be possible to generate the digital audio carrier intermediate frequency directly by means of the frequency synthesizer and feed it directly into phase splitter 606, in which case, phase-lock loop 624, video demodulator 610, crystal oscillator 625, and voltage-controlled oscillator 607 would be unnecessary.

FIG. 7 shows a block diagram of a television receiver or tuner equipped with digital audio decoding according to the invention. Receiving antenna 701 is fed into RF tuner 702 where the desired channel is selected. A television cable or the output from a satellite down-convertor may be substituted for antenna 701. Tuner 702 is different from normal TV tuners in that it includes an extra digital audio IF output 705 at 46.95 MHz, in addition to the normal sound IF output 703 at 41.25 MHz and vision IF output 704 at 45.75 MHz. Again, as in the vision exciter IF, the digital audio IF is at a higher frequency than the vision IF as a result of the mixing process in tuner 702.

Separate intermediate frequency amplifiers for vision 707, FM sound 706, and digital audio 708 are shown.

Standard techniques are used for these IF amplifiers, except that it is desirable to include a digital audio carrier image rejection filter at the digital audio carrier offset frequency (1.19' MHz or 1.20 MHz) below the vision carrier intermediate frequency. A combined IF amplifier could be used for vision and FM sound, but the performance compromises to both picture and sound that this entails makes the use of separate IF amplifiers the preferred approach.

The vision carrier intermediate frequency signal 709 is taken from vision IF strip 707 and fed into mixers 710 and 711 at the outputs of the FM sound and digital audio IF strips 706 and 708 respectively. Mixers 710 and 711 produce two intercarrier sound signals, FM sound signal 712 and digital audio signal 713. FM sound signal 712 is filtered by band-pass filter 714, which has a center frequency equal to the offset between the vision carrier frequency and the FM sound carrier frequency, i.e. 4.5 MHz. Multiplex sound signal 717 appears at the output of FM detector 715 and left and right sound channels are decoded from multiplex sound signal 717 by optional BTSC decoder 716. The output of BTSC decoder 716 is two analog sound signals 718 and 719, one for the left program channel, and one for the right program channel, respectively.

Digital audio intercarrier signal 713, produced by mixer 711, is filtered by band-pass filter 720, which has a center frequency equal to the offset between the vision carrier frequency and the digital audio carrier frequency, i.e. 1.19' MHz or 1.20 MHz. The filtered signal is fed into QPSK demodulator 721 which reinserts the suppressed digital audio carrier and produces a digital bit stream at approximately 512 kb/s (the same bit rate as that used in the digital modulator). A detailed description of the QPSK demodulator is given below.

Digital audio demultiplexer 722 applies error correction to the digital audio bit-stream and may also perform a de-framing function. The precise function of demultiplexer 722 depends on the digital coding scheme used. For instance, if the preferred ADM digital coding scheme is used, and the Signetics NE 5241 chip is used for audio decoder 723, then demultiplexer 722 extracts, from single bit-stream 726 presented to its input, the three bit-streams (an audio data bit stream, a step-size bit-stream and an emphasis bit-stream) required by audio decoder 723.

Audio decoder 723 recovers at least two channels of analog audio information from digital bit stream 727 presented to its input. The precise nature of audio decoder 723 depends on what type of digital audio coder was used in the transmitter. The output of audio decoder 723 is left program channel and right program channel audio signals 724 and 725 respectively.

The output of the vision IF strip 707 is demodulated in vision demodulator 730 and color decoding is carried out in chroma decoder 732. Also recovered in chroma decoder 732 is the 3.58' MHz color sub-carrier signal, which is fed through a suitable buffer (not shown) to provide a clock reference for QPSK demodulator 721, demultiplexer 722 and audio decoder 723.

Since two pairs of left and right channel sound signals are produced by the sound circuitry of the receiver, and only one pair can be listened to at a time, there has to be some way of choosing between them. This can be done by means of a user-operable switch. Alternatively, and preferably, switching can be automatic, so that when the receiver detects a digital audio signal, it selects the output of the digital audio decoder (signals 724 and 725) automatically. FM sound (signals 718 and 719) would only be selected when the selected station is not transmitting a digital audio signal, or, if the digital audio system does not have a SAP capability, when the viewer selects the Second Audio Program.

Details of QPSK demodulator 721 (FIG. 7) is shown in FIG. 8. The modulated carrier signal 801 from the output of filter 720 (FIG. 7) is presented to mixers 802 and 803. Also presented to mixers 802 and 803 are two signals at the digital audio carrier frequency 804 and 805 in quadrature with one-another, taken from the output of phase shifter 806. Mixing modulated carrier 801 and quadrature carrier-frequency signals 804 and 805 recovers I and Q signals 809 and 810. Digital audio carrier-frequency signal 808, which was suppressed in the modulator, is recovered by carrier recovery loop 807.

For digital audio frequency signal carrier 808 to effectively demodulate modulated carrier signal 801, it has to be at the correct frequency and to have the same phase, relative to modulated carrier signal 801, as the digital audio carrier had in the transmitter. Ensuring that carrier frequency signal 808 has the correct frequency is simple: in a chroma-locked system, the output of chroma oscillator 732 (FIG. 7) is divided by three (3) in the same way that the output of chroma oscillator 313 (FIG. 3) was divided by three (3) by divider 315 in data modulator 212 (FIG. 2).

Because of differing delays in the digital audio and video paths, the phase of the chroma oscillator in the receiver is not sufficiently accurate for a non-phase-controlled frequency-divided chroma signal to be used as carrier signal .808. To give digital audio carrier frequency signal 808 the correct phase requires that the signal from the output of the divider on the output of the chroma oscillator (not shown) be subject to a variable delay (not shown). The length of the delay (and hence the phase of recovered carrier 808) is controlled by means of a Costas loop (not shown) which compares modulated carrier signal 801 with a signal formed by mixing the recovered carrier with the demodulated signal at point 809. Alternatively, other techniques well known in the art can be used to control the phase of carrier frequency signal 808.

In an intercarrier offset locked system, the modulator of which is shown in FIG. 6, a 1.2 MHz crystal oscillator is substituted for the output of the chroma oscillator frequency divider in the above discussion. The crystal oscillator still needs a control loop similar to that outlined above to give digital audio carrier frequency signal 808 the correct phase.

Low pass filters 810 and 811, of which more will be said later, limit the effective bandwidth of the receiver, and comparators 812 and 814 and clocked latches 816 and 818 recover the data. Latches 816 and 818 are clocked by clock signal 820 generated by clock recovery circuit 822. Clock recovery circuit 822 reconstructs the transmit data clock so that latches 816 and 818 look at the outputs of comparators 812 and 814 respectively only at times when the modulated carrier is in a state corresponding to one of the four QPSK constellation points. See FIG. 5 and discussion thereof.

Like digital audio carrier frequency signal 808, recovered clock signal 820 needs to have same frequency and phase as the original data clock signal in the encoder. In a chroma-locked system, such as that for which the modulator is shown in FIG. 3, a signal of the correct frequency can be derived simply by dividing the output of the receiver's chroma oscillator (not shown) by the appropriate number, in this case seven (7). In an intercarrier offset locked system, such as that for which the modulator is shown in FIG. 67, a crystal oscillator of the appropriate frequency can be used.

The clock recovery signals in both systems need phase correction so that the data is fed into output latches 816 and 718 at the appropriate time (see above). Again a clock delay technique can be used, but deriving the control signal for the delay is simpler than that required for a sufficiently accurate recovery of the digital audio carrier. It is sufficient to compare zero-crossings in the output of the clock signal delay circuit with the average phase of zero-crossings in the signal at the output of low-pass filter 810 or 812.

In a normal QPSK system, combining logic 822 simply interleaves alternate bits from I and Q data streams 824 and 826 respectively from the outputs of latches 816 and 818 to form single output bit stream 828. For meaningful data to be decoded from such a scheme, however, the absolute phase of the transmit/receive system needs to be known. This can be done by a number of well-known techniques, such as transmitting phase-reference code-words that enable subsequent digital processing of digital bit-stream 828 to determine and correct the phase of the system.

Alternatively, differential QPSK coding does not require knowledge of the absolute phase of the transmit/receive system, but requires more complexity in continuing logic for combining I and Q data streams 824 and 826 into a single data stream 828. Combining logic 822 looks at the last two digits that it emitted into the combined bit-stream and the next I and Q bits. Logic 822 then emits one of four possible combinations of two bits depending on the phase change between the state represented by the next I and Q bits and the phase represented by the previous two bits emitted into the combined bit-stream.

In the systems described herein, the filtering of the digital audio signals plays a critical role in enabling a digital audio signal with a bit rate high enough for a high quality audio to within the meagre interstices of the NTSC frequency spectrum. Filters are used in both the modulator (e.g 302, 303, 602, and 603) and the demodulator (810 and 811). The requirements for these filters will now be discussed. It is appropriate to leave discussion of filtering to this point in the application because the term "filtering" includes all the filtering in the complete modulator-transmitter-propagation-receiver-demodulator path between the I,Q splitter (301 in FIG. 3, 601 in FIG. 6) in the modulator to the input of comparators 812 and 814 in the demodulator. Filtering includes the modulator baseband lowpass filter (e.g. 302 and 303 in FIG. 3), any IF and RF filtering in the vision exciter and transmitter, RF and IF filtering in the vision receiver, and demodulator baseband lowpass filter (e.g. 810 and 811 in FIG. 8). It also includes any effect that the propagation path between transmitter and receiver might have on the frequency response of the vision signal (e.g. selective fade).

While QPSK can theoretically achieve a spectral efficiency of 2 b/s/Hz, this efficiency is not achievable in practice since "brick wall" filtering is not practically realizable. The steepness of the filtering determines spectral efficiency. Steep filters ring, so attempting to improve the spectral efficiency of QPSK sharpening the filtering increases the ringing of the individual data pulses. Unless ringing is controlled, it can cause adjacent data pulses to interfere with each other (intersymbol interference), reducing the accuracy with which the digital data can be recovered. Filtering can be optimized, however, so that the waveform of every data point, except that of the pulse being detected, passes through zero at the instant the receiver samples the waveform. Nyquist filters have this desired characteristic. A commonly used class of Nyquist filters are the "raised cosine" filters which have a frequency response as shown in FIG. 9, and as defined by:

$$H(j\omega) = \begin{cases} 1, & \left[ 0 \leq \omega \leq \frac{\pi}{T_s}(1-\alpha) \right] \\ \cos^2\left\{ \frac{T_s}{4\alpha} \left[ \frac{\omega - \pi(1-\alpha)}{T_s} \right] \right\}, & \left[ \frac{\pi}{T_s}(1-\alpha) \leq \omega \leq \frac{\pi}{T_s}(1+\alpha) \right] \\ 0, & \left[ \omega \leq \frac{\pi}{T_s}(1+\alpha) \right] \end{cases}$$

Such filters are characterized by the parameter alpha, which is a measure of the fractional excess of the bandwidth of the filter over that of a perfect "brick wall" (alpha=0) filter. A filter meeting the amplitude response of the above equation, and having constant group delay (linear phase), will have no inter-symbol interference.

It is best to design all of the intended filtering into the system at IF or baseband, and to make all other circuitry wideband. The most precise control over filtering is achieved by using lowpass filtering in the base band. It is much easier to make a precision 125 kHz lowpass filter than a precision 250 kHz IF filter.

As alpha is reduced, the spectral efficiency of QPSK is improved. The relationship between spectral efficiency and alpha is defined by:

$$\epsilon = \frac{2}{1+\alpha}$$

where $\epsilon$ is the spectral efficiency in bits/Hz.

As alpha is reduced, the data waveform will ring more and the "eye" pattern of the decoded waveform will become more complex. In the demodulator shown in FIG. 8, the eye pattern is observed at point 823, where the analog waveform is sampled to recover the data, just after baseband lowpass filter 810. FIG. 10 shows some examples of eye patterns for alpha=0.3, alpha=0.7, and alpha=1.0.

As alpha is reduced and spectral efficiency improved, the eye patterns become more complex. An overall greater accuracy is required to implement of low alpha systems because any error in amplitude or phase linearity will rapidly degrade the complex eye of such a system. The eye will appear to close. Comparing FIG. 10c and 10d shows the degradation in the opening of an alpha=0.3 eye caused by poor filtering. Partial eye closure due to imperfect filtering leaves less margin against noise and interference, and increases the difficulty of accurately recovering the digital information.

For optimal performance over a noisy channel, the amplitude portion of the filtering should be partitioned in equal portions between the transmitter and receiver i.e. the filter in the modulator and the filter in the demodulator should both have an amplitude response equal to the square root of the Nyquist filter response. When the two filter characteristics are cascaded, they will result in a Nyquist filter. The combined filters should have linear phase (constant group delay). If both the transmit and receive filters individually have linear phase, the combination will as well. However, it is also acceptable for the receive filter to have group delay variations and to compensate for these in the transmit filter.

Attempting to achieve good spectral efficiency with low alpha filtering requires that more accurate filters with good phase compensation be used. Filters may be implemented with either analog or digital circuitry. Since the signal in the modulator is in digital form, it is an attractive idea to use a digital filter in the modulator. In the receiver, where cost is more important, filtering is more easily implemented with an analog filter which does not require A-D converters with high sample rates and anti-aliasing pre-filters. Moreover, it is desirable in broadcast applications, again for cost reasons, to use a filter of minimal complexity (without phase compensation) in the demodulator in the receiver. If the demodulator filter magnitude response accurately matches the square root of a Nyquist response, then the modulator filter can be implemented as an FIR (finite impulse response) filter with an impulse response which is simply the time reversal of the impulse response of the filter in the demodulator. The cascaded filters will then have a symmetrical impulse response with constant group delay, and will have an amplitude response equal to that of a Nyquist filter. The matched filter criterion is satisfied, so performance in the presence of noise will be optimal. All phase compensation is done in the transmit filter so receiver cost is minimized. The only disadvantage of this approach over a fully phase compensated approach is that it complicates definition of the system.

The system, as described above, does produce signal components which lie outside the allocated NTSC television channel. For reasons already discussed, the out-of-band signals do not pose a practical problem, but the fact that the system generates such signals may make the system unacceptable. By further narrowing the bandwidth of the digital audio signal, the signal can be made to lie entirely within the allocated channel. The bandwidth can be narrowed by reducing the bit rate by, for instance, using a transform coder to encode and decode the audio, which considerably increases the cost of the receiver, or by using a QPRS digital modulation scheme, which increases receiver complexity and suffers the performance disadvantages discussed above.

What is claimed is:

1. Apparatus for transmitting digitally encoded sound signals on a modulated carrier associated with a standard NTSC color television broadcast signal, wherein the signal components of the NTSC signal are contained within an RF bandwidth of nominally 6 MHz, the FM sound signal carrier frequency is nominally 4.5 NHz above the vision carrier frequency, the NTSC color subcarrier frequency is nominally 3.579545 MHz above the vision carrier frequency, and in the RF spectrum of broadcast and cable systems the standard spacing between the vision carrier frequencies of adjacent channel NTSC signals is 6 MHz, and wherein the standard NTSC color television signal may have its FM sound carrier modulated in accordance with the BTSC multi-channel television sound system, comprising modulated carrier signal generation means for receiving sound signals and for generating in response thereto a digitally modulated Quadrature Phase Shift Keyed (QPSK) carrier signal, and carrier frequency setting means for setting the frequency of said digitally modulated carrier signal with respect to the components of said NTSC television broadcast signal and for setting the level of said digitally modulated carrier signal, wherein aid carrier signal is set at a frequency about 1.2 MHz below the vision carrier frequency of the NTSC signal and the level of said carrier signal is set at about −23 dB relative tot he peak vision carrier level.

2. Transmitting apparatus according to claim 1 wherein said carrier frequency setting means derives the frequency offset of the carrier signal with respect to the vision carrier frequency by dividing said NTSC color subcarrier frequency by three.

3. Transmitting apparatus according to claim 2 wherein said sound signals are digitally encoded baseband audio signals.

4. Apparatus for transmitting digitally encoded sound signals on a modulated carrier associated with a standard NTSC color television broadcast signal, wherein the signal components of the NTSC signal are contained within an RF bandwidth of nominally 6 MHz, the FM sound signal carrier frequency is nominally 4.5 MHz above the vision carrier frequency, the NTSC color subcarrier frequency is nominally 3.579545 MHz above the vision carrier frequency, and in the RF spectrum of broadcast and cable systems the standard spacing between the vision carrier frequencies of adjacent channel NTSC signals is 6 MHz, and wherein the standard NTSC color television signal may have its FM sound carrier modulated in accordance with the BTSC multi-channel television sound system, comprising modulated carrier signal generation means for receiving sound signals and for generating in response thereto a digitally modulated carrier signal, said modulated carrier signal generation means including Quadrature Partial Response Signaling (QPRS) modulator means for generating a digitally modulated carrier signal, and carrier frequency setting means for setting the frequency of said digitally modulated carrier signal with respect to the components of said NTSC television broadcast signal and for setting the level of said digitally modulated carrier signal, wherein said carrier signal is set at a frequency about 1.2 MHz below the vision carrier frequency of the NTSC signal and the level of said carrier signal is set at about −20 dB relative to the peak vision carrier level.

5. Transmitting apparatus according to claim 4 wherein said carrier frequency setting means derives the frequency offset of the carrier signal with respect to the vision carrier frequency by dividing said NTSC color subcarrier frequency by three.

6. Transmitting apparatus according to claim 5 wherein said sound signals are digitally encoded baseband audio signals.

7. Method for transmitting digitally encoded sound signals on a modulated carrier associated with a standard NTSC color television broadcast signal, wherein the signal components of the NTSC signal are contained within an RF bandwidth of nominally 6 MHz, the FM sound signal carrier frequency is nominally 4.5 MHz above the vision carrier frequency, the NTSC color subcarrier frequency is nominally 3.579545 MHz above the vision carrier frequency, and in the RF spectrum of broadcast and cable systems the standard spacing between the vision carrier frequencies of adjacent channel NTSC signals is 6 MHz, and wherein the standard NTSC color television signal may have its FM sound carrier modulated in accordance with the BTSC multi-channel television sound system, comprising receiving sound signals and generating in response thereto a digitally modulated Quadrature Phase Shift Keyed (QPSK) carrier signal, setting the frequency of said digitally modulated carrier signal with respect to the components of said NTSC television broadcast signal at a frequency about 1.2 MHz below the vision carrier frequency of the NTSC signal, and setting the level of said digitally modulated carrier signal at about −23 dB relative to the peak vision carrier level.

8. Transmitting method according to claim 7 further comprising deriving the frequency offset of the carrier signal with respect to the vision carrier frequency by dividing the NTSC color subcarrier frequency by three.

9. Transmitting method according to claim 8 wherein said sound signals are digitally encoded baseband audio signals.

10. Method for transmitting digitally encoded sound signals on a modulated carrier associated with a standard NTSC color television broadcast signal, wherein the signal components of the NTSC signal are contained within an RF bandwidth of nominally 6 MHz, the FM sound signal carrier frequency is nominally 3.579545 MHz above the vision carrier frequency, and in the RF spectrum of broadcast and cable systems the standard spacing between the vision carrier frequencies of adjacent channel NTSC signals is 6 MHz, and wherein the standard NTSC color television signal may have its FM sound carrier modulated in accordance with the BTSC multi-channel television sound system, comprising receiving sound signals and generating in response thereto a digitally modulated Quadrature Partial Response Signaling (QPRS) carrier signal, setting the frequency of said digitally modulated carrier signal with respect to the components of said NTSC television broadcast signal, wherein said carrier signal is set at a frequency about 1.2 MHz below the vision carrier frequency of the NTSC signal and, setting the level of said digitally modulated carrier signal at about −20 dB relative to the peak vision carrier level.

11. Transmitting method according to claim 10, further comprising deriving the frequency offset of the carrier signal with respect to the vision carrier frequency by dividing the NTSC color subcarrier frequency by three.

12. Transmitting method according to claim 11 wherein said audio signals are digitally encoded baseband audio signals.

13. Apparatus for receiving a digital audio signal, the signal comprising digitally-encoded audio signals modulated on a suppressed digital audio carrier signal, the carrier signal being associated with a standard NTSC color television broadcast signal, wherein the signal components of the NTSC signal are contained within an RF bandwidth of nominally 6 MHz, the FM sound signal carrier frequency is nominally 4.5 MHz above the vision carrier frequency, the color subcarrier frequency is nominally 3.579545 MHz above the vision carrier frequency, and in the RF spectrum of broadcast and cable systems the standard spacing between the vision carrier frequencies of adjacent channel NTSC signals is 6 MHz, and wherein the standard NTSC color television signal may have its FM sound carrier modulated in accordance with the BTSC multi-channel television sound system, and wherein the frequency of the digital audio carrier signal is about 1.2 MHz below the frequency of the NTSC vision carrier, and the digital audio signal has a nominal bandwidth in the range of 0.5 to 0.7 times the total data rate of the digitally-encoded audio signals, comprising digital audio signal demodulating means for receiving the digital audio signal and for generating in response thereto audio signals, digital audio carrier signal generating means for generating a carrier reinsertion signal at the frequency of the digital audio carrier signal for reinserting into said digital audio signal as the suppressed carrier thereof.

14. Receiving apparatus according to claim 13 wherein said digital audio carrier signal generating means includes frequency generating means for generating said carrier reinsertion signal at the same frequency as the frequency of said digital audio carrier signal, and phase adjusting means for adjusting the phase of said reinsertion signal relative to said digital audio signal whereby the reinsertion signal, after adjustment, bears the same phase relationship to the digital audio signal as the digital carrier signal bore to said digital audio signal.

15. Receiving apparatus according to claim 14 wherein said frequency generating means includes a crystal oscillator and said reinsertion signal has a frequency of about 1.2 MHz.

16. Receiving apparatus according to claim 15 wherein said phase adjusting means includes variable delay means for delaying said reinsertion signal in response to a control signal, and phase comparison means for comparing the phase of a signal derived from said delayed reinsertion signal and said a signal derived from digital audio signal and for generating said control signal.

17. Receiving apparatus according to claim 16 wherein said phase comparison means comprises a Costas loop comparison means, said Costas loop comparison means having its inputs connected to
said digital audio signal, and
said digital audio signal mixed with said delayed reinsertion signal, and its output connected to said variable delay means.

18. Receiving apparatus according to claim 14 wherein said frequency generating means includes
chroma oscillator means for deriving the chroma subcarrier signal from the NTSC signal, and
dividing means for dividing the frequency of said chroma subcarrier signal by a factor of three, the resulting frequency-divided signal having a frequency of 1.19' MHz.

19. Receiving apparatus according to claim 18 wherein said phase adjusting means includes
variable delay means for delaying said reinsertion signal in response to a control signal, and
phase comparison means for comparing the phase of a signal derived from said delayed reinsertion signal and said a signal derived from digital audio signal and for generating said control signal.

20. Receiving apparatus according to claim 19 wherein said phase comparison means comprises a Costas loop comparison means, said Costas loop comparison means having
its inputs connected to
said digital audio signal, and
said digital audio signal mixed with said delayed reinsertion signal, and
its output connected to said variable delay means.

21. Receiving apparatus as in any of claim 13 through 20 wherein said digital audio signal demodulating means includes Quadrature Phase Shift Keying (QPSK) demodulator means for generating a digital bit stream in response to said digital audio signal and said carrier reinsertion signal.

22. Receiving apparatus according to claim 21 wherein the digital audio signal was filtered by a modulator filtering means following modulation of the digitally-encoded audio signals on the suppressed digital audio carrier signal, and said QPSK demodulator means includes
mixing means for mixing together said digital audio signal and said carrier reinsertion signal, and
demodulator filtering means for filtering the signal resulting from mixing said digital audio signal and said carrier reinsertion signal, the combined characteristics of said modulator filtering means and said demodulator filtering means defining the digital audio bandwidth of the system.

23. Receiving apparatus according to claim 20 wherein
said modulator filtering means and said demodulator filtering means each has an amplitude response which is the square root of the desired filtering amplitude response,
said demodulator filtering means is simple and has non-constant phase response and group delay, and
said modulator filtering means is complex and compensates for the non-constant phase response and group delay of Said demodulator filtering means whereby the system filtering characteristic has the desired amplitude response and constant phase response and group delay with minimum complexity in the receiving apparatus.

24. Receiving apparatus according to claim 22 wherein the digitally encoded audio signals were responsive to an encode data clock, and said QPSK demodulator means further comprises
data sampling means, responsive to a data clock signal, for sampling the amplitude of the signal from said demodulator filtering means, said data clock signal having
the same frequency as the encode data clock, and
the same phase relationship to said signal from said demodulator filter as the encode data clock had to the digitally-encoded audio signals.

25. Receiving apparatus according to claim 24 said QPSK demodulator means further comprising
data clock phase adjusting means for adjusting the phase of said data clock signal relative to the phase of said signal from said decoder filter whereby the amplitude of said filtered signal is sampled at points corresponding to the cardinal points of the QPSK constellation, said data clock phase adjusting means comprising
data clock frequency generating means,
data clock variable delay means for delaying the signal from said data clock frequency generating means in response to a control signal,
control signal generating means responsive to the difference between the zero-crossings of said delayed data clock signal and of the signal from said demodulator filtering means.

26. Receiving apparatus according to claim 21 wherein said demodulating means additionally comprises convertor means for receiving a digital bit stream derived from said QPSK demodulator means and deriving from said bit stream at least one analog audio signal.

27. Receiving apparatus according to claim 26 wherein the digital audio signal was filtered by a modulator filtering means following modulation of the digitally-encoded audio signals on the suppressed digital audio carrier signal, and said QPSK demodulator means includes
mixing means for mixing together said digital audio signal and said carrier reinsertion signal, and
demodulator filtering means for filtering the signal resulting from mixing said digital audio signal and said carrier reinsertion signal, the combined characteristics of said modulator filtering means and said demodulator filtering means defining the digital audio bandwidth of the system.

28. Receiving apparatus according to claim 27 wherein
said modulator filtering means and said demodulator filtering means each has an amplitude response which is the square root of the desired filtering amplitude response,
said demodulator filtering means is simple and has non-constant phase response and group delay, and
said modulator filtering means is complex and compensates for the non-constant phase response and group delay of said demodulator filtering means whereby the system filtering characteristic has the desired amplitude response and constant phase response and group delay with minimum complexity in the receiving apparatus.

29. Receiving apparatus according to claim 27 wherein the digitally encoded audio signals were responsive to an encode data clock, and said QPSK demodulator means further comprises
data sampling means, responsive to a data clock signal, for sampling the amplitude of the signal from said demodulator filtering means, said data clock signal having
the same frequency as the encode data clock, and
the same phase relationship to said signal from said demodulator filter as the encode data clock had to the digitally-encoded audio signals.

30. Receiving apparatus according to claim 29 said QPSK demodulator means further comprising
- data clock phase adjusting means for adjusting the phase of said data clock signal relative to the phase of said signal from said decoder filter whereby the amplitude of said filtered signal is sampled at points corresponding to the cardinal points of the QPSK constellation, said data clock phase adjusting means comprising
- data clock frequency generating means,
- data clock variable delay means for delaying the signal from said data clock frequency generating means in response to a control signal,
- control signal generating means responsive to the difference between the zero-crossings of said delayed data clock signal and of the signal from said demodulator filtering means.

31. Receiving apparatus as in any of claim 13 through 20 wherein said digital audio signal demodulating means includes Quadrature Partial Response System (QPRS) demodulator means for generating a digital bit stream in response to said digital audio signal and said carrier reinsertion signal.

32. Receiving apparatus according to claim 31 wherein the digital audio signal was filtered by a modulator filtering means following modulation of the digitally-encoded audio signals on the suppressed digital audio carrier signal, and said QPRS demodulator means includes
- mixing means for mixing together said digital audio signal and said carrier reinsertion signal, and
- demodulator filtering means for filtering the signal resulting from mixing said digital audio signal and said carrier reinsertion signal, the combined characteristics of said modulator filtering means and said demodulator filtering means defining the digital audio bandwidth of the system.

33. Receiving apparatus according to claim 32 wherein
- said modulator filtering means and said demodulator filtering means each has an amplitude response which is the square root of the desired filtering amplitude response,
- said demodulator filtering means is simple and has non-constant phase response and group delay, and
- said modulator filtering means is complex and compensates for the non-constant phase response and group delay of said demodulator filtering means whereby the system filtering characteristic has the desired amplitude response and constant phase response and group delay with minimum complexity in the receiving apparatus.

34. Receiving apparatus according to claim 32 wherein the digitally encoded audio signals were responsive to an encode data clock, and said QPRS demodulator means further comprises
- data sampling means, responsive to a data clock signal, for sampling the amplitude of the signal from said demodulator filtering means, said data clock signal having
  - the same frequency as the encode data clock, and
  - the same phase relationship to said signal from said demodulator filter as the encode data clock had to the digitally-encoded audio signals.

35. Receiving apparatus according to claim 34 said QPRS demodulator means further comprising
- data clock phase adjusting means for adjusting the phase of said data clock signal relative to the phase of said signal from said decoder filter whereby the amplitude of said filtered signal is sampled at points corresponding to the cardinal points of the QPRS constellation, said data clock phase adjusting means comprising
- data clock frequency generating means,
- data clock variable delay means for delaying the signal from said data clock frequency generating means in response to a control signal,
- control signal generating means responsive to the difference between the zero-crossings of said delayed data clock signal and of the signal from said demodulator filtering means.

36. Receiving apparatus according to claim 31 wherein said demodulating means additionally comprises convertor means for receiving a digital bit stream derived from QPRS demodulator means and deriving from said bit stream at least one analog audio signal.

37. Receiving apparatus according to claim 36 wherein the digital audio signal was filtered by a modulator filtering means following modulation of the digitally-encoded audio signals on the suppressed digital audio carrier signal, and said QPRS demodulator means includes
- mixing means for mixing together said digital audio signal and said carrier reinsertion signal, and
- demodulator filtering means for filtering the signal resulting from mixing said digital audio signal and said carrier reinsertion signal, the combined characteristics of said modulator filtering means and said demodulator filtering means defining the digital audio bandwidth of the system.

38. Receiving apparatus according to claim 37 wherein
- said modulator filtering means and said demodulator filtering means each has an amplitude response which is the square root of the desired filtering amplitude response,
- said demodulator filtering means is simple and has non-constant phase response and group delay, and
- said modulator filtering means is complex and compensates for the non-constant phase response and group delay of said demodulator filtering means whereby the system filtering characteristic has the desired amplitude response and constant phase response and group delay with minimum complexity in the receiving apparatus.

39. Receiving apparatus according to claim 37 wherein the digitally encoded audio signals were responsive to an encode data clock, and said QPRS demodulator means further comprises
- data sampling means, responsive to a data clock signal, for sampling the amplitude of the signal from said demodulator filtering means, said data clock signal having
  - the same frequency as the encode data clock, and
  - the same phase relationship to said signal from said demodulator filter as the encode data clock had to the digitally-encoded audio signals.

40. Receiving apparatus according to claim 38 said QPRS demodulator means further comprising
- data clock phase adjusting means for adjusting the phase of said data clock signal relative to the phase of said signal from said decoder filter whereby the amplitude of said filtered signal is sampled at points corresponding to the cardinal points of the QPRS constellation, said data clock phase adjusting means comprising data clock frequency generating means, data clock variable delay means for delaying the signal from said data clock frequency generating means in response to a control signal, control signal generating means responsive to the difference between the zero-crossings of said delayed data clock signal and of the signal from said demodulator filtering means.

41. Method for receiving a digital audio signal, the signal comprising digitally-encoded audio signals modulated on a suppressed digital audio carrier signal, the carrier signal being associated with a standard NTSC color television broadcast signal, wherein the signal components of the NTSC signal are contained within an RF bandwidth of nominally 6 MHz, the FM sound signal carrier frequency is nominally 4.5 MHz above the vision carrier frequency, the color subcarrier frequency is nominally 3.579545 MHz above the vision carrier frequency, and in the RF spectrum of broadcast and cable systems the standard spacing between the vision carrier frequencies of adjacent channel NTSC signals is 6 MHz, and wherein the standard NTSC color television signal may have its FM sound carrier modulated in accordance with the BTSC multi-channel television sound system, and wherein the frequency of the digital audio carrier signal is about 1.2 MHz below the frequency of the NTSC vision carrier, and the digital audio signal has a nominal bandwidth in the range of 0.5 to 0.7 times the total data rate of the digitally-encoded audio signals, comprising receiving the digital audio signal and generating in response thereto audio signals, generating a carrier reinsertion signal at the frequency of the digital audio carrier signal and reinserting said reinsertion signal into said digital audio signal as the suppressed carrier thereof.

42. Method according to claim 41 further comprising generating said carrier reinsertion signal at the same frequency as the frequency of said digital audio carrier signal, and adjusting the phase of said reinsertion signal relative to said digital audio signal whereby the reinsertion signal, after adjustment, bears the same phase relationship to the digital audio signal as the digital carrier signal bore to said digital audio signal.

43. Method according to claim 42 wherein said step of generating said reinsertion signal at the same frequency as the frequency of said digital audio carrier signal further comprises deriving the chroma subcarrier signal from the NTSC signal, and dividing the frequency of said chroma subcarrier signal by a factor of three, the resulting frequency-divided signal having a frequency of 1.19' MHz.

44. Method according to claim 43 wherein said step of adjusting phase includes delaying said reinsertion signal in response to a control signal, and comparing the phase of a signal derived from said delayed reinsertion signal and said a signal derived from digital audio signal and for generating said control signal.

45. Method as in any of claims 41 through 44 wherein said step of demodulating said digital audio signal includes generating a digital bit stream in response to said digital audio signal and said carrier reinsertion signal by means of Quadrature Phase Shift Keying (QPSK) demodulator.

46. Method according to claim 45 wherein said step of demodulating said digital audio signal additionally comprises receiving a digital bit stream derived from said QPSK demodulator means and deriving from said bit stream at least one analog audio signal.

47. Method as in any of claim 41 and 44 wherein said step of demodulating said digital audio signal includes generating a digital bit stream in response to said digital audio signal and said carrier reinsertion signal by means of Quadrature Partial Response System (QPRS) demodulator.

48. Method according to claim 47 wherein said step of demodulating said digital audio signal additionally comprises receiving a digital bit stream derived from said QPRS demodulator means and deriving from said bit stream at least one analog audio signal.

49. Transmitting apparatus according to claim 4 wherein said sound signals are digitally encoded baseband audio signals.

50. Transmitting method according to claim 10, wherein said audio signals are digitally encoded baseband audio signals.

* * * * *

UNITED STATES PATENT AND TRADEMARK OFFICE
CERTIFICATE OF CORRECTION

PATENT NO. : 5,357,284
DATED : October 18, 1994
INVENTOR(S) : Craig C. Todd

It is certified that error appears in the above-identified patent and that said Letters Patent is hereby corrected as shown below:

In column 6, line 34 delete "255,681" and insert --255.681--.

In column 14, lines 28-32 delete the sentence "Because of differing delays in the digital audio and video paths, the phase of the chroma oscillator in the receiver is not sufficiently accurate for a non-phase-controlled frequency-divided chroma signal to be used as carrier signal .808."

In column 14, lines 41-43 delete the sentence "Alternatively, other techniques well known in the art can be used to control the phase of carrier frequency signal 808."

In the claims.

In claim 1, column 17, line 68, delete "NHz" and insert --MHz--, in column 18, line 17, delete "aid" and insert --said--, and in column 18, line 21, delete "tot he" and insert --to the--.

UNITED STATES PATENT AND TRADEMARK OFFICE
CERTIFICATE OF CORRECTION

PATENT NO. : 5,357,284
DATED : October 18, 1994
INVENTOR(S) : Craig C. Todd

It is certified that error appears in the above-identified patent and that said Letters Patent is hereby corrected as shown below:

Rewrite claim 10 as indicted

10. Method for transmitting digitally encoded sound signals on a modulated carrier associated with a standard NTSC color television broadcast signal, wherein the signal components of the NTSC signal are contained within a RF bandwidth of nominally 6 MHz, the FM sound signal carrier frequency is nominally 4.5 MHz above the vision carrier frequency, the NTSC color subcarrier frequency is nominally 3.579545 MHz above the vision carrier frequency, and in the RF spectrum of broadcast and cable systems the standard spacing between the vision carrier frequencies of adjacent channel NTSC signals is 6 MHz, and wherein the standard NTSC color television signal may have its FM sound carrier modulated in accordance with the BTSC multi-channel television sound system, comprising receiving sound signals and generating in response thereto a digitally modulated Quadrature Partial Response Signaling (QPRS) carrier signal, setting the frequency of said digitally modulated carrier signal with respect to the components of said NTSC television broadcast signal, wherein said carrier signal is set at a frequency about 1.2 MHz below the vision carrier frequency of the NTSC signal and,

UNITED STATES PATENT AND TRADEMARK OFFICE
CERTIFICATE OF CORRECTION

PATENT NO. : 5,357,284
DATED : October 18, 1994
INVENTOR(S) : Craig C. Todd

It is certified that error appears in the above-identified patent and that said Letters Patent is hereby corrected as shown below:

setting the level of said digitally modulated carrier signal at about -20 dB relative to the peak vision carrier level.

In claim 21, column 21, line 26, delete "claim" and insert --claims--.

In claim 23, column 21, line 46, delete "20" and insert --22--, and in column 21, line 56, delete "Said" and insert --said--.

In claim 31, column 23, line 18, delete "claim" and insert --claims--.

In claim 40, column 24, line 60, delete "38" and insert --39--.

In claim 47, column 26, line 29, delete "claim 41 and 44" and insert --claims 41 through 44--.

Signed and Sealed this

Twenty-fifth Day of May, 1999

Q. TODD DICKINSON

*Attest:*

*Attesting Officer*  *Acting Commissioner of Patents and Trademarks*